United States Patent [19]

Hartung

[11] Patent Number: 4,574,346
[45] Date of Patent: Mar. 4, 1986

[54] METHOD AND APPARATUS FOR PERIPHERAL DATA HANDLING HIERARCHIES

[75] Inventor: Michael H. Hartung, Tucson, Ariz.

[73] Assignee: International Business Machines Corporation, Armonk, N.Y.

[21] Appl. No.: 426,367

[22] Filed: Sep. 29, 1982

[51] Int. Cl.⁴ .................. G06F 12/08; G06F 13/14
[52] U.S. Cl. ............................................. 364/200
[58] Field of Search ... 364/200 MS File, 900 MS File

[56] References Cited

U.S. PATENT DOCUMENTS

| | | | |
|---|---|---|---|
| 3,328,768 | 6/1967 | Amdahl | 364/200 |
| 3,890,601 | 6/1975 | Pietroiewicz | 364/200 |
| 3,938,097 | 2/1976 | Niguette, III | 364/200 |
| 3,967,247 | 6/1976 | Andersen et al. | 364/200 |
| 4,080,652 | 3/1978 | Cronshaw et al. | 364/200 |
| 4,118,789 | 10/1978 | Casto et al. | 364/900 |
| 4,128,882 | 12/1978 | Dennis | 364/200 |
| 4,197,580 | 4/1980 | Chang et al. | 364/200 |
| 4,313,161 | 1/1982 | Hardin et al. | 364/200 |
| 4,403,288 | 9/1983 | Christian et al. | 364/200 |
| 4,429,363 | 1/1984 | Duke et al. | 364/200 |
| 4,466,059 | 8/1984 | Bastian et al. | 364/200 |

Primary Examiner—Eddie P. Chan
Attorney, Agent, or Firm—H. F. Somermeyer

[57] ABSTRACT

Data supplied to a data storage system by a host processor has one of two use status. A first use status is that the supplied data is to be retentively stored in the data storage system. A second use status is that the supplied data is exempted from the retentive storage requirement. An example of exempted use status is that data only temporarily stored in the data storage system, i.e. is transitory. A second example is data that is being manipulated prior to retentive storage, data that is temporarily volatile. Termination of the exempted use status results in either discard or a retentive storage of the exempted use data. Data integrity controls for the exempted use status data are described. The invention is described for a data storage hierarchy environment having a volatile cache and a magnetic recorder as a backing store. The exempted use data need be stored only in or primarily in the cache while retentive data is primarily stored in the retentive store and selectively in the cache.

64 Claims, 8 Drawing Figures

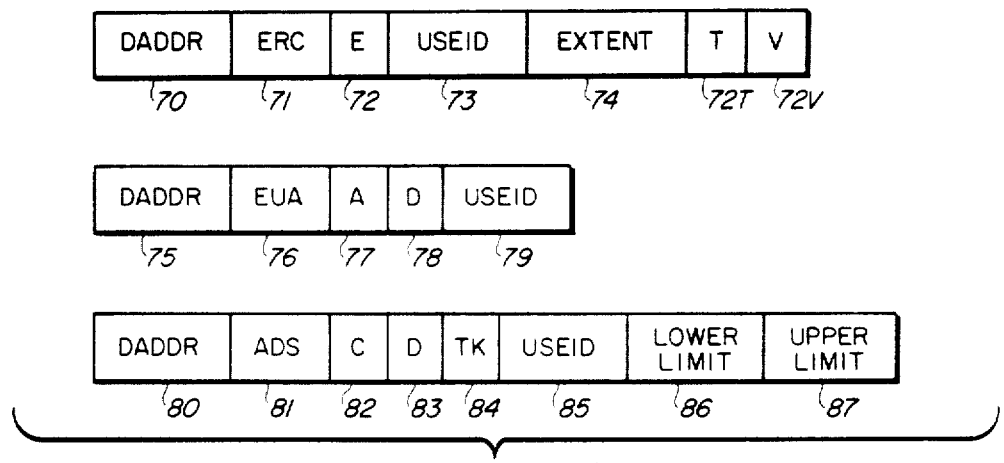
FIG-4
FIG-5
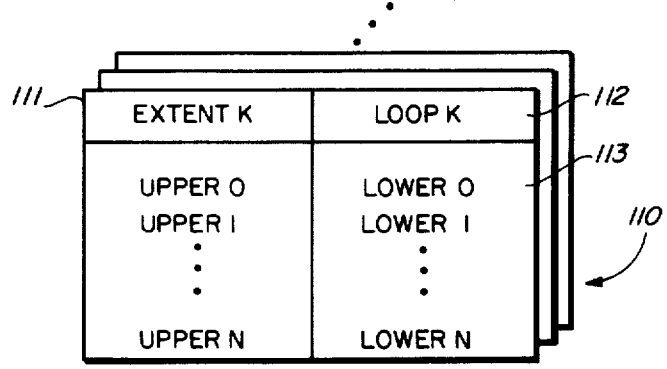

METHOD AND APPARATUS FOR PERIPHERAL DATA HANDLING HIERARCHIES

FIELD OF INVENTION

The present invention relates to multilevel data handling systems, such as storage hierarchies; more particularly to the control thereof with respect to controlling data stored therein.

DISCUSSION OF THE PRIOR ART

Peripheral data-storage hierarchies have been used for years for providing an apparent store as suggested by Eden, et al. in U.S. Pat. No. 3,569,938. Eden, et al teach that in a demand paging or request system, caching data in a cache-type high-speed front store (buffer) can make a peripheral storage system appear to have a large capacity, yet provide fast access to data; fast access being faster than that provided by the back store. Eden, et al also teach that the back store can be a retentive store, such as magnetic tape recorders and magnetic disk recorders (direct access storage devices or DASD), while the front store can be a volatile store, such as a magnetic core store. With the advances in data storage technology, the front store typically includes semiconductive-type data storage elements. U.S. Pat. No. 3,839,704 shows another form of such a storage hierarchy.

An important aspect of storage hierarchies is enabling data integrity. That is, the data received from the user, such as a central processing unit (CPU) of other data handling device, should be returned to the supplying unit either correct or with an indication that errors may exist. Also, it is typical practice in data storage hierarchies to automatically move data from a higher level to a lower level for retentive storage as well as limiting the data in the higher levels such that other data can be stored for fast access. U.S. Pat. No. 4,020,466 shows copying changes from a high-level store to a backing store, while U.S. Pat. No. 4,077,059 shows forcing copyback under predetermined conditions. Such copyback operations can consume storage hierarchy time, i.e., so much data may be copied back that access to the data by a using unit may be degraded. This problem is partially solved by U.S. Pat. No. 3,588,839 which teaches that the only data that need be copied back from a high-level storage unit to a low-level storage unit is that data that is altered, i.e., where there is noncongruence between data in a backing store and data in a front store.

Storage hierarchies have taken diverse forms. For example, in accordance with the Eden, et al U.S. Pat. No. 3,569,938 a single high-speed store serviced several users. U.S. Pat. No. 3,735,360 shows that each procesor can have its own high-speed store, or cache, for different performance reasons. Performance of the storage hierarchies also is affected by the algorithms and other controls used to place predetermined data into the cache front store, or high-speed (fast access) storage portion. Accordingly, U.S. Pat. No. 3,898,624 shows that varying the time of fetching data from a backing store to a front, or caching store can be selected by a computer operator in accordance with the programs being executed in a CPU. In this manner, it is hoped that the data resident in the cache, or upper level of the hierarchy, will be that data needed by the CPU while other data not needed is not resident. All of these operations become quite intricate. Accordingly, evaluation programs have been used to evaluate how best to manage a data storage hierarchy. U.S. Pat. Nos. 3,964,028 and 4,068,304 show performance monitoring of data storage hierarchies for enhancing optimum performance while ensuring data integrity. Much of the work with respect to storage hierarchies has occurred in the cache and main memory combinations connected to a CPU. The principles and teachings from a cached main memory relate directly to caching and buffering peripheral systems, as originally suggested by Eden, et al., supra. Of course, main memory has been used prior to Eden, et al. for buffering or caching data from a magnetic tape and disk unit for a CPU, i.e., a main memory was not only used as a CPU working store but also as a buffer for peripheral devices. To enhance access to data, some data is "pinned" or "bound" to the front store; that is, a copy of such data is guaranteed to be kept in the front store while other data is subject to replacement by new data based upon usage characteristics. Unless such pinned data is copied to a retentive store, a significant data integrity exposure exists.

The performance monitoring referred to above indicates that it is not always in the best interests of total data processing performance and integrity to always use a caching buffer interposed between a using unit and a backing store. For example, U.S. Pat. No. 4,075,686 teaches that a cache can be turned on and off by special instructions for selectively bypassing the cache. Further, the backing store or memory can be segmented into logical devices with some of the logical devices, or segments, being selectively bypassed, such as for serial or sequential input-output operations. This patent further teaches that, for certain commands, it is more desirable to not use cache than to use cache. U.S. Pat. No. 4,268,907 further teaches that for a command specifying the fetching of data words an indicator flag is set to a predetermined state. To prevent replacement of extensive numbers of data instructions already stored in cache during the execution of such instructions, such flag conditions replacement circuits to respond to subsequent predetermined commands to bypass cache storage for subsequently fetched data words. U.S. Pat. No. 4,189,770 shows bypassing cache for operand data while using cache for instruction data.

In newer designs, the storage capacity of the front store tends to increase. Such increased capacity is often accompanied with faster I/O channel rates, which in turn place increased demands on which data is stored in the front store. Such changes mean that more and more data is stored in the front store. This increased data storage in a volatile front store aggravates a data integrity problem which may be caused by power supply perturbations or outages, for example. Integrity can be ensured by always recording the data in a retentive back store. This requirement tends to degrade performance, i.e., increases data access times. Selective retentive journalling of data as suggested by C. E. Hoff, et al in IBM TECHNICAL DISCLOSURE BULLETIN article "Selective Journalling", June 1975, Vol. 18 No. 1, Pages 61–2, reduces performance degradation but does not control the data integrity exposure in a satisfactory manner. In a similar vein, Campbell, et al in the IBM TECHNICAL DISCLOSURE BULLETIN, Vol. 18, No. 10, March 1976, pages 3307-9 show multiple replacement classes in a replacement control for limiting interlevel transfers in a multilevel hierarchy. Such techniques still leave a large data integrity exposure or provide limited performance.

A peripheral data storage system's operation-completion indication to a host processor is usually a DEVICE END signal; the DEVICE END indicates that the data received from the host is retentively stored in the data storage system. Commonly assigned application for patent, Ser. No. 241,273, filed Mar. 6, 1981, now U.S. Pat. No. 4,410,942, shows a tape data recorder system including a volatile buffer having plural modes of operation. In a preferred mode, termed "tape buffer mode", the above-described DEVICE END signal is supplied to the host processor when the data is stored in the volatile buffer but not yet stored in the retentive-storing tape recorder. The data is stored in the tape recorder after the DEVICE END signal. A separate SYNCHRONIZE command from the host to the data storage system requires that all data stored in the volatile buffer be then stored in the tape recorder. In other modes of operation of the volatile buffer, the DEVICE END signal is only sent to the host after the data is stored in the retentive tape recorder. The data storage system also honors a command READ DATA BUFFER which transfers data stored in the buffer (whether sent to the buffer by the host or by a tape recorder) to the host. When data is sent by a host to the data storage system, such data is always intended to be and will be recorded in a retentive tape recorder, as indicated above. The READ DATA BUFFER involves an error recovery technique; usually there is no way of retrieving the data in buffer that was received from the host for a write-to-tape operation.

A possible solution to the data integrity exposure is to provide a retentive front store, such as used in the IBM 3850 Mass Storage System. There DASDs are the cache, or front store, while magnetic tape is a back store. A simplified showing of this type of storage hierarchy is found in the article by Blickenstaff, et al "Multilevel Store Directory Integrity", IBM TECHNICAL DISCLOSURE BULLETIN, Vol. 20 No 3, August 1977, pages 939-940. Unfortunately, such retentive buffer usually does not provide the performance (short data access times) sometimes demanded by present-day computers. Accordingly, for a truly high-performance-type storage hierarchy, some means must be found to use a large volatile front store while controlling the attendant data integrity exposures. This exposure control also applies to other systems such as printing, communications, and the like.

SUMMARY OF INVENTION

It is an object of the present invention to provide an enhanced control of data usage in a cached data storage system having a nonretentive or volatile cache.

In accordance with the invention, data stored or storable in a data storage system having a volatile cache and a retentive backing store has data classified into two major use classes. A first class, retentive data storage, is a storage use of the data in which the data storage system indicates to any user that the received data is retentively stored in the data storage system; that is, the received data is completely committed to the data storage system for ensuring data integrity and error-free storage. A second class of data usage is the exempted data use wherein the data storage subsystem does not ensure retentive data integrity (exempt from retentive storage commitment), but does ensure correct nonretentive or volatile data storage. In another sense, the user, usually a host processor, retains partial responsibility for the data having an exempted use status. The exempted use status allows storage of the data primarily in the volatile cache without requiring an early movement of that data from the volatile cache to the retentive back store.

In a first aspect of the invention, the reasons and the usages of exempted data need not be known to the data storage system. In another aspect within the scope of the present invention, the exempted use status includes two subclasses of data use status. A first subclass is a transient status in which the data is only temporarily stored in the volatile cache and need not be stored at all in the back store. Upon completion of the transient use status, the transient use data that is in the cache is discarded. If such transient use data had been moved to the retentive backing store, then that data need not be altered by the discard of data from the cache. A second subclass is the volatile use status in which for the present time the data may be stored in the cache and any data loss will be recovered by the user. Upon completion of the volatile data use status, the data becomes retentively stored data and is moved to the retentive backing store. Included in the first aspect of the invention is the exercise of control over exempted use data of discarding (unbeknownst to the subsystem, the exempted use data was transient) the data or retentively storing the data (volatile data). This action is an alter data status operation.

Retentively stored data requires congruence between the copy of the data in the retentive backing store and any copies of the data in the volatile cache store. Exempted use status obviates this requirement. For exempted use data, any error detected related to the exempted use data that is not localized to identified portions of the exempted use data results in blocking access to that data for forcing the user to employ suitable error recovery procedures. Such controls can be on a device address or smaller granularity (logical devices, track, cylinder, etc.) basis or on a complete storage system basis. For example, many data storage systems employ direct access storage (DASD) disk-type magnetic recorders. The controls can be related to each individual DASD. The identification of exempted data use status is preferably on an address granularity smaller than an addressable device, such as a track of data, a record or block of data, and the like.

As an aid to data integrity of exempted use data, access to such exempted use data is on a controlled or limited basis, i.e., to users or for uses specified to the data storage system by the user host processor. For retentively stored data, the usual write file mask may be employed to limit writing access to data areas while read access is only limited by RESERVE-RELEASE.

The exempted data need not be separately tagged; the exempted data can be identified using a data storage extent or USEID control technique. The use status is not a characteristic of the data, rather it relates to the present contemplated uses of that data. It is desirable that the access to the data be controlled in accordance with its retentive or exempted status.

In a preferred mode of operation, the data storage system moves data from the cache to the retentive backing store using diverse replacement algorithms. These replacement algorithms can be employed for retentive data and can apply equally to the exempted data. For simplicity and low cost, it is preferred that the retentive and volatile data be treated alike in the cache replacement control. As a variation of the concept of the invention, the transiently stored data can be in a replacement class of data which is replaced after the volatile class of data has been replaced from cache. The transient data replacement is deferred because of the expected discard of the data from the cache. The usual other cache controls can be applied to either the retentive or exempted data. For example, data bound to cache can be either retentively stored or stored under an exempted use status.

The foregoing and other objects, features, and advantages of the invention will be apparent from the following more particular description of preferred embodiments of the invention, as illustrated in the accompanying drawings.

THE DRAWING

FIG. 1 diagrammatically illustrates a data storage system employing the present invention in a manner to accent the practice of the present invention.

FIG. 4 diagrammatically illustrates a plurality of host-to-data storage system commands used in connection with practicing the present invention.

Figure 2:
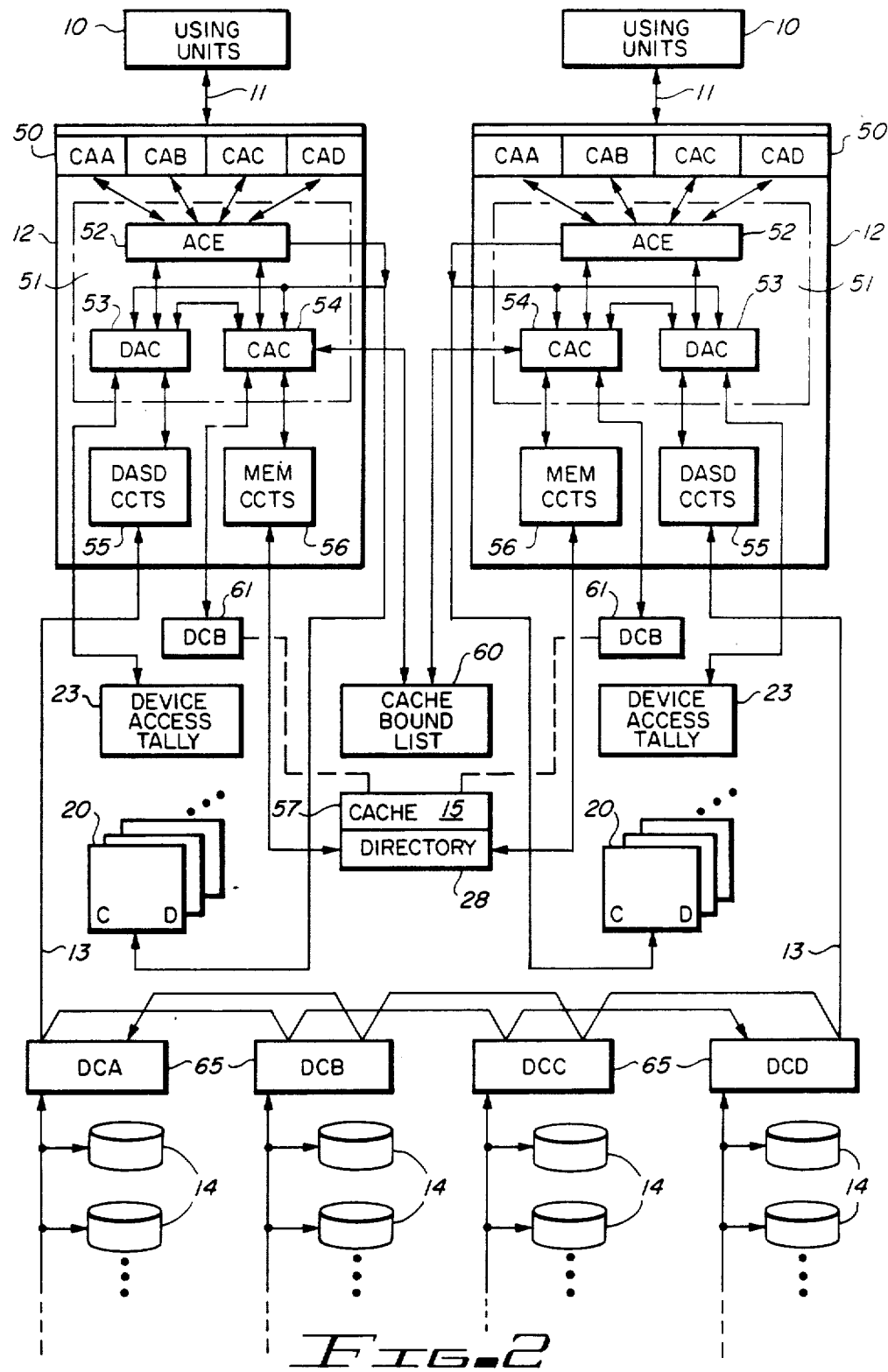
FIG. 2 is a block diagram of a practical embodiment of the present invention.

FIG. 5 diagrammatically illustrates some data control structures used in the FIG. 2 illustrated system for practicing the present invention.

Figure 3:
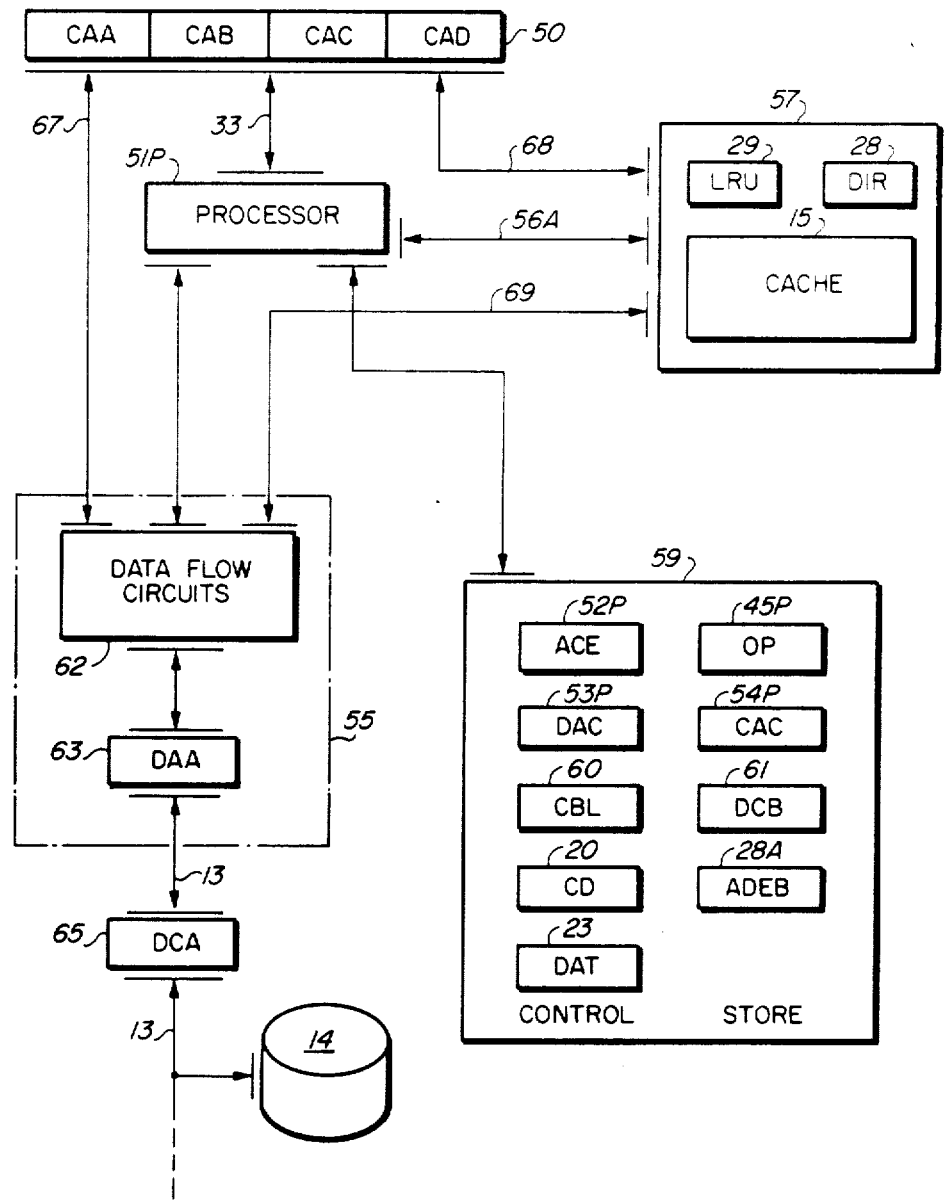
FIG. 3 is a simplified drawing of the FIG. 2 illustrated system for showing a programmed processor implementation of the present invention.
Figure 6:
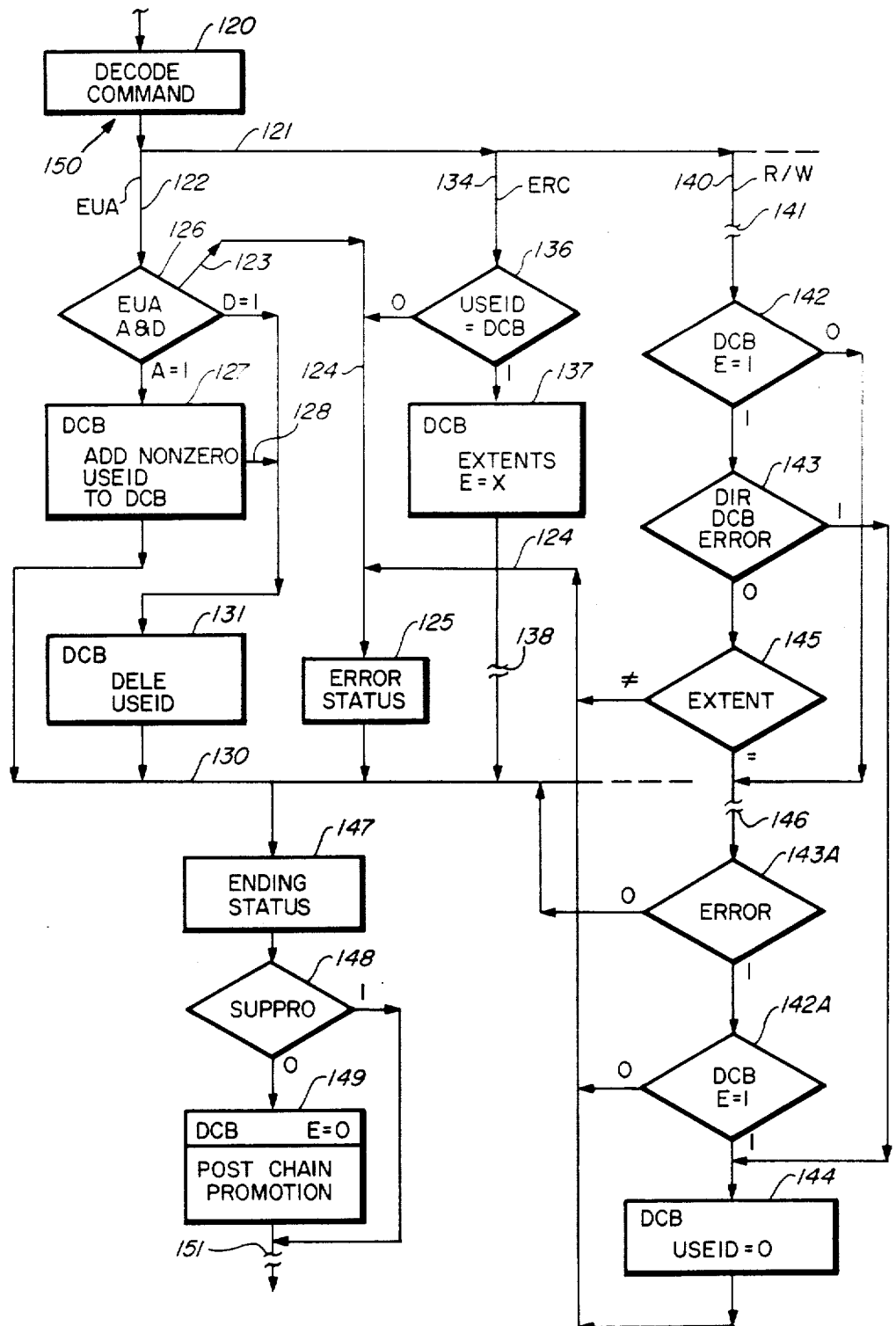
Figure 7:
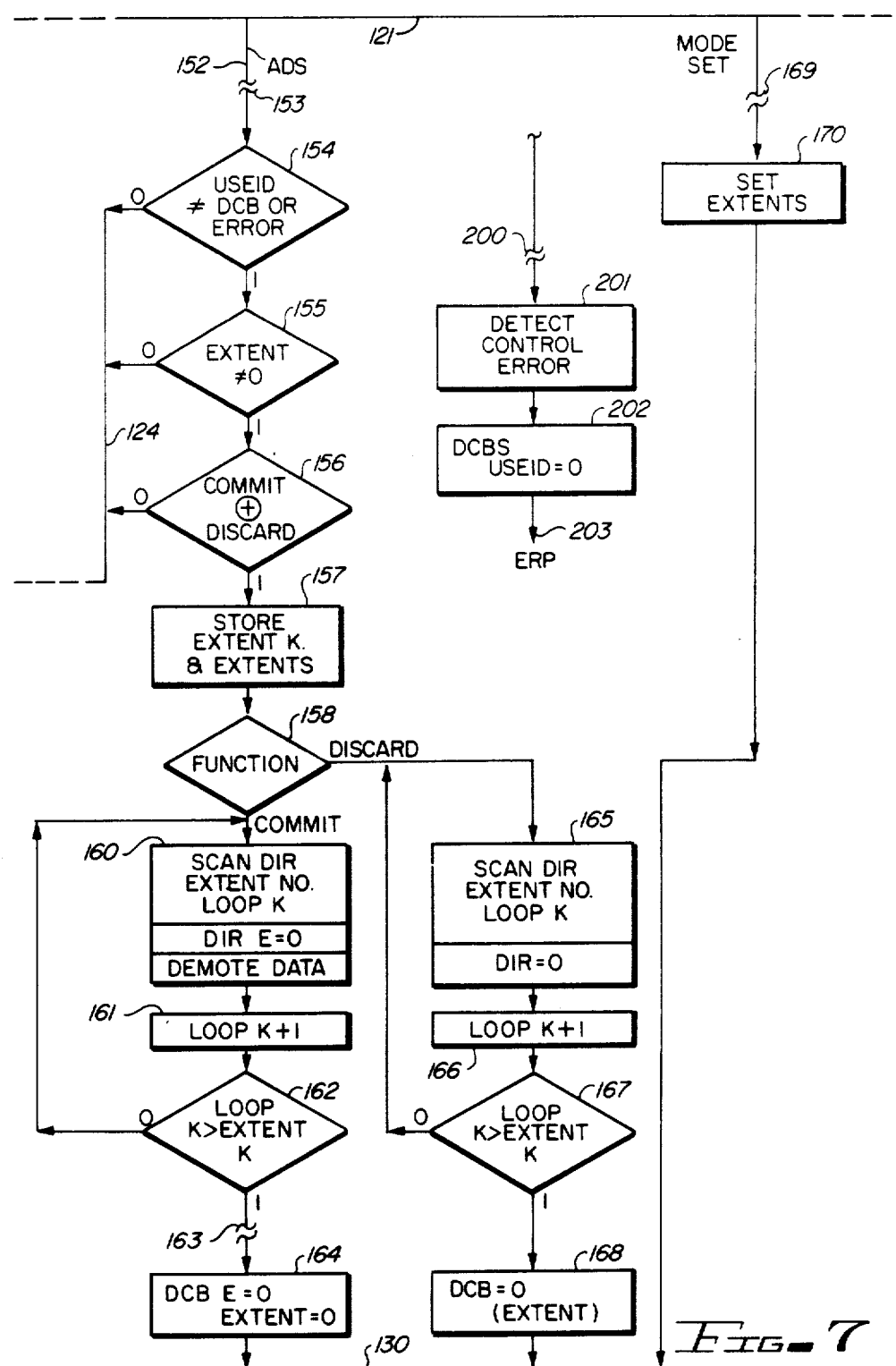

FIGS. 6 and 7 are machine operation charts illustrating implementation of the invention in the FIGS. 2 and 3 illustrated data storage system.

Figure 8:
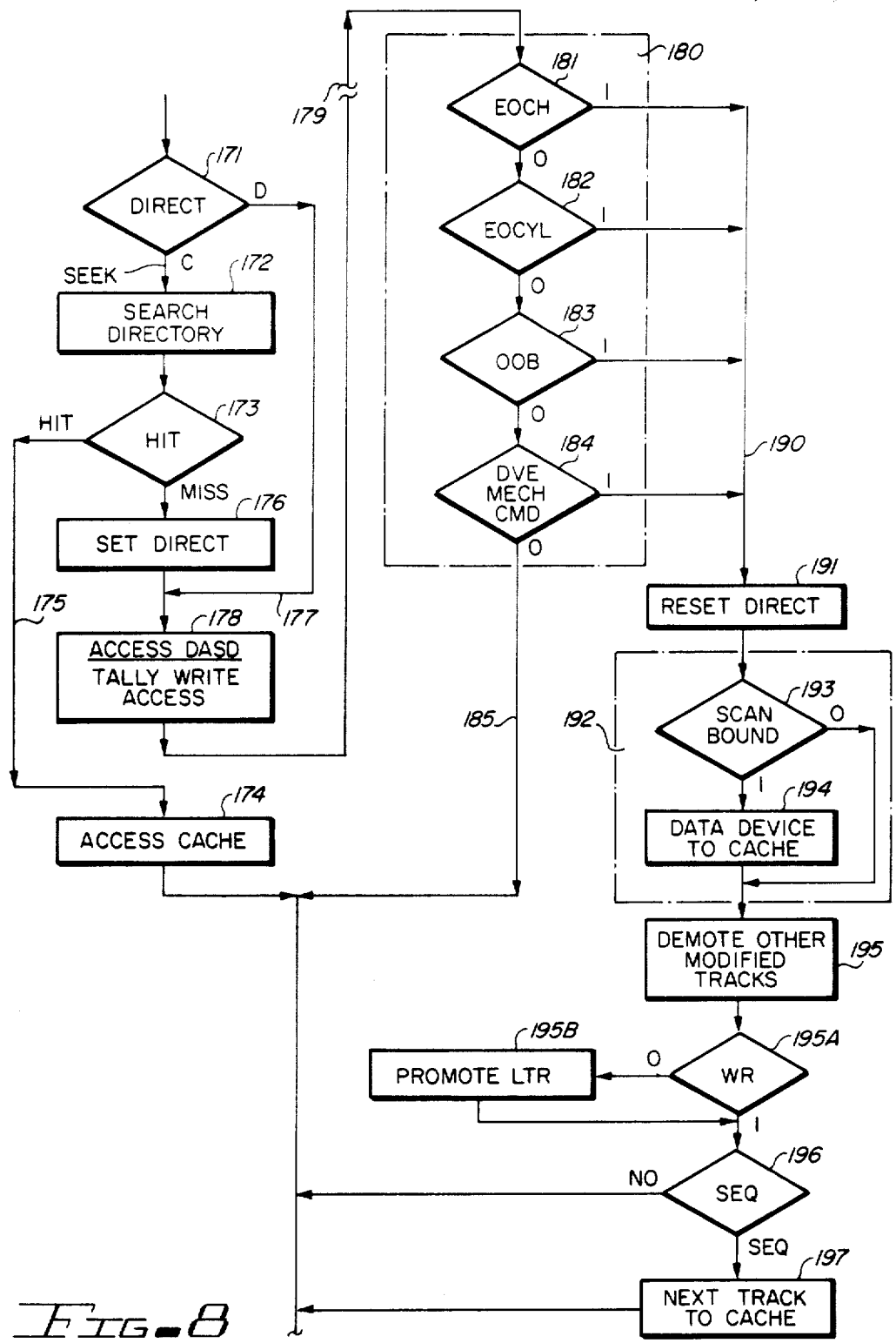

FIG. 8 is a machine operations chart showing cache data status controls common to both retentive and exempted use data.

DETAILED DESCRIPTION

Referring now more particularly to the drawing, like numerals indicate like parts and structural features in the various diagrams. Using units, or hosts 10, access data areas on DASD 14 via I/O connection 11 and control unit or storage director 12. DASD 14 is coupled to control unit 12 via a device connection 13. A cache data storage 15 provides data caching to using units 10 for DASD 14. The addressing in cache 15 is based upon addresses to DASD 14 with directory 28 dynamically providing an index to the addressable storage areas of cache 15 for data stored therein, and corresponding to certain addresses of DASD 14. Within cache 15, area 16 stores retentively stored data. Area 17, for example, can store exempted data which is transient in nature (ET). Areas 18 and 19 store volatile exempted data (EV). The areas 16, 17, 18 and 19 are dynamically defined in accordance with the addresses of DASD 14 extents. The space allocations of cache 15, relationships of the data contents of cache 15 to the operation of using units 10 and data stored in DASD 14, as well as accesses to cache 15 are managed by control 26 of control unit 12. Such management includes accessing directory 28 each time a request is made by using units 10 for access to data supposedly stored in cache 15. If the data is stored in cache 15, then the data is transferred directly between using units 10 and cache 15. However, a cache miss may occur, i.e., the data is not stored in cache 15. Accordingly, as a result of scanning directory 28, a cache miss indication 30 is supplied to cache data promotion and replacement control 24. This indication results in promoting data from DASD 14 to cache 15 and then transferring the data from cache 15 to using units 10. In another arrangement, a cache miss results in using units 10 accessing DASD 14 directly (cache bypass on a cache miss for a direct access to DASD). This latter technique is applicable to general application data storage systems while the former technique is applicable to paging and swapping data storage systems, no limitations thereto intended. The promotion and replacement of data to and from cache 15 is in part controlled via device access tally DAT 23 which records the type of attempted data accesses to cache 15 in a list arranged by using units 10; the effect of an analysis of such tally is explained later with respect to FIG. 8. LRU 29 is an ordered list of the addressable storage areas of cache 15 that are currently storing data in an order of least recent usage (LRU) by using units 10, as will be discussed later with respect to FIG. 5. Using units 10 directly access DASD 14 via device access circuits 21 which include those electronic circuits normally associated with storing and retrieving data to and from a DASD 14.

Figure 1:
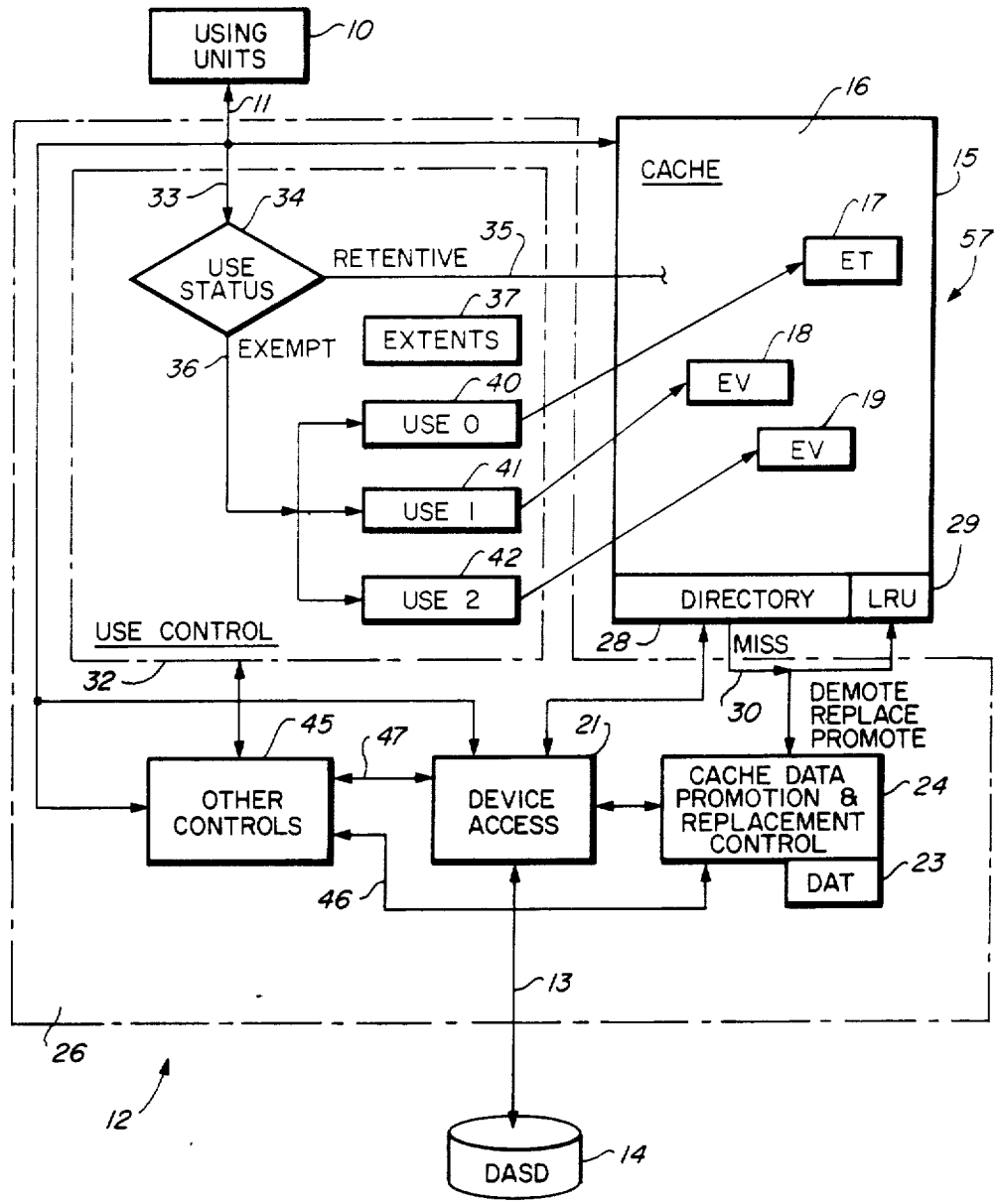

In accordance with the invention, control 26 also includes use control 32 which is shown in simplified form in FIG. 1. An attempted data access by using units 10, which is not a direct access to DASD 14, is indicated by line 33. Control unit 12 at 34 examines the use status of the instant data access; that is, a data access includes addresses relating to DASD 14. If that use status is retentive, then the usual prior-art-type request for processing follows for accessing data in area 16, as indicated by line 35. However, when the use status is exempted from retentive storage, then control unit 12 follows path 36 to examine the use authorizations of the exempted stored data; that is, in a first preferred form, not required in all instances, access to exempted use data stored in cache 15 or in DASD 14 requires authorization through use identifications, as indicated by numerals 40, 41 and 42, respectively, for areas 17, 18 and 19. Use number 0 allows access only to ET 17. There may be one use or a plurality of uses. The use may be coexistent with a computer program or computer process in using units 10 which is often referred to as a user, i.e., an application program, for example. The address extents of areas of 17, 18 and 19 are indicated in table 37 labeled "extents" which are organized in accordance with the use identifications 40, 41 and 42. Each use may have one or more defined address extents for exempted use data. In some applications, the use access may not be limited by EV, ET or address extents.

Other controls 45 represent those controls usually found in a DASD control unit. These controls receive channel commands via I/O connection 11, decode the commands and supervise execution thereof. Line 46 represents the control exercised over cache promotion and replacement as will become apparent. Line 47 shows control over device access circuits 21. USE control 32 is also affected via decoded commands in a usual manner.

The data storage system in storing exempted-use data ensures the same integrity to that data as to retentively stored data. In other words, when an error condition is detected in cache 15 or DASD 14 relating to exempted data, then there is a data loss that should be isolated. The data storage system, in detecting the data loss, can indicate that the loss is limited to specific stored data elements. When this is the case, that data loss is reported to using units 10, with access to the data in error being controlled in accordance with known error recovery procedures. In some instances, the data loss is not isolable; then access to such exempted data is blocked. An example of isolable data loss is detection of a data error in cache 15, while a nonisolable data loss would be a detection of an error in control data, such as in directory 28.

FIG. 2 illustrates a preferred embodiment of the invention as employed in a two storage director 12 arrangement. Each storage director 12 includes a plurality of so-called channel adaptors 50, also separately denominated as CAA through CAD, which connect the respective storage directors 12 to a plurality of using units 10 via a plurality of input/output connections 11. Each storage director 12 also includes a programmed processor 51 which, as usual, includes a processing unit (see FIG. 3) having a control store (FIG. 3) storing computer programs for performing the storage director functions of control 26 (FIG. 1). The programmed processor 51 includes address and command evaluator ACE 52 programs which evaluate peripheral commands received from a using unit 10. Such functions are also performed in present day storage directors for noncached DASD, as widely sold throughout the world. The programmed processor 51 also includes direct access control DAC 53 programs which responds to commands evaluated and decoded by ACE 52 to control data transfers between using units 10 and addressed ones of the DASDs 14, as well as to provide device commands to DASDs 14 for performing well-known DASD access and control functions. Programmed processor 51 further includes CAC 54, a cache access control program for accessing cache 15. CD bits (flip-flops) 20, one for each of the DASDs 14, are accessed by DAC 53 and CAC 54 for determining whether to access cache 15 (CD=C) or DASD 14 (CD=D) and for setting the bits to D (access DASD) after a cache miss. Connections from storage director 12 to DASDs 14 are via DASD circuits 55 which are constructed using known device adaptor and data flow design techniques. Cache 15 is accessed via memory circuits 56 which include circuits for generating addresses and cache access requests. Cache 15 is a portion of a large random access store 57, hereinafter referred to as a system store. A directory 28 for cache 15 is also stored in system store 57. The directory 28 is accessed using known hashing techniques based upon the address structure of DASD 14. Each unit of data, track or record stored in cache 15 has an entry in directory 28, as is known in the data processing art. Additionally, using units 10 can command the storage directors 12 to keep data in cache, i.e., pin or bind the data to cache 15. For all bound tracks and records, a cache bound list 60, stored within directory 28 but shown separately for clarity, indicates to both storage directors 12 which data stored in cache 15 is to remain in cache 15. Each storage director 12 has its own device access tally 23 which tallies the type of data accesses in a chain of commands for controlling data promotion and demotion. Device control block DCB 61 contains the USEIDs (items 40, 41, 42 of FIG. 1) and the optionally associated data extents (based upon DASD 14 addresses).

FIG. 3 illustrates electronic circuits used to implement the FIG. 2 illustrated system. Processor 51P is the calculator portion of computer 51. Control store 59 stores the various programs, such as ACE 52P corresponding to ACE 52, DAC 53P corresponding to DAC 53, CAC 54P corresponding to CAC 54, and other programs OP 45P corresponding in part to other controls 45 of FIG. 1. Processor 51P is coupled to all of the electronic units such as system store 57, DASD circuits 55, control store 59 and channel adaptors 50 for controlling same using known programmed processor techniques.

DASD circuits 55 include data flow circuits 62 which are data detectors, error correction circuits, and the like, usually found in a control unit 12. Device adaptor DAA 63 couples data flow circuits 62 to device interconnection 13, and thence to device controller DCA 65. When using units 10 are directly accessing DASD 14, the data flow path includes adaptors 50, bidirectional bus 67, DASD circuit 55, device connection 13, and device controller 65. Processor 51P, during such direct access, monitors and supervises the operation in the usual manner. Peripheral commands received from using units 10 pass through adaptors 50 over bus 33 to processor 51P, which then invokes ACE 52P for decoding same. Data transfers between cache 15 of system store 57 proceed over bidirectional bus 68. In a similar manner, data transfers between cache 15 and DASD 14 are over bidirectional bus 69 and DASD circuits 55. System store 57 is controlled and accessed by processor 51P via bidirectional bus 56A.

Other data structures of control store 59 usable in connection with practicing the present invention include cache bound list CBL 60, CD flip flops 20, device access tally DAT 23, and active directory entry buffer ADEB 28A, which contains one entry of directory 28 for the addressable area in cache 15 currently being accessed. DCB 61 completes the data structures of interest to and understanding of the present invention. It is to be understood that in a practical embodiment, several other data structures would be used for controlling data storage director 12. The using units 10 and data storage director 12 interactions with respect to the present invention are conveniently defined by three input/output, peripheral or channel commands. The term "channel commands" is that term used in connection with data processing systems manufactured by International Business Machines Corporation (IBM), Armonk, N.Y. A first of the three commands, "ESTABLISH REFERENCE CHARACTERISTICS", is a channel command in which the using units 10 signify to the data storage system that data subject to the exempted usage will be forthcoming. When peripheral operations employ chains of peripheral commands, such as employed in IBM data processing systems, the ESTABLISH REFERENCE CHARACTERISTICS (ERC) command can be related to a single chain of commands, or can be used for establishing exempted use data for a plurality of command chains, as will be explained. Preferably, a use identification (USEID) accompanies this channel command for expanding or deleting the uses for a given set of exempted use data. A second channel command, "ESTABLISH USAGE ATTRIBUTES" (EUA), adds and deletes USEIDs for exempted data to be later initialized by ERC. The EUA commands precede the ERC commands for establishing USEIDs to be used in connection with the ERC commands. A third channel command is "ALTER DATA STATUS" (ADS) which establishes extents of addresses of DASD 14 which will be subject to exempted use or may be decommitted from exempted use and returned to retentive use. This command also can discard transient use data. Acceptance of an ADS command is dependent on USEID authority established by a preceding EUA command.

FIG. 4 illustrates the three new channel commands. Each of the channel commands has an associated device address DADDR 70, 75 and 80, respectively, which is the device address to which the I/O operation is directed. Accordingly, the characteristics of exempted use are DASD 14 related. Command bytes 71, 76, 81 indicate which channel command is being received. ERC 71 indicates the ESTABLISH REFERENCE CHARACTERISTICS command. E bit 72 indicates whether the data to be transferred in a following chain of commands is exempted or not. Within a given command chain, of which ERC is a member, all data references (SEARCH, READ, or WRITE) in the ensuing commands of that chain are to be treated as references to data which is an exempted use, i.e., can be lost if data storage system control data has errors. All data writes performed in the ensuing commands in the chain are performed to the cache 15 only and may not result in an update of the copy of such data on any DASD 14. It should be noted there that because of cache data promotion and replacement control 24 (FIG. 1) cache 15 space management, such exempted use data may in fact, independent of the use status, be transferred from cache 15 to the addressed DASD 14. All data referenced within a command chain having an ERC command is referred to as exempted use data. In the ERC command, USEID 73 is a use identification token. The use identification token can identify a so-called "user", such as an application program in a using unit 10. The USEID 73 identifies computer processes within using units 10 which must be informed when an attempt to access a cache 15 addressable data storage area identified with exempted use data fails because of a loss of system control data. Such system control data is described with respect to FIG. 5. A loss of this data, in effect, destroys the addressability of the cache 15 stored data; hence, is an effective loss of data. The computer process identified by USEID will then invoke its own recovery for all of the exempted data for which it has retained recovery responsibilities. Upon completion of that recovery, data processing activities with respect to the data storage system are restarted. When the control data loss includes loss of USEIDs, access to exempted data is blocked (USEID=0 means no authority of access), which is an implicit notification of the control data error.

In a multiuser environment, or when using units 10 include a plurality of host processors, USEID must be unique for all hosts. The USEID may include a host ID. When the host ID is sent to the data storage system separately from computer process ID, in building a USEID token the data storage systems must be able to identify the host to ensure uniqueness of the token (process IDs are expected to be duplicated). Typically, exempted use data is not shared among multiple users (no limitation thereto intended); hence, the USEID relates only to the user (computer process) which created the data and will be the only computer process which references data throughout its existence during its exempted status. The second channel command EUA includes the command byte EUA 76. "A" bit 77 indicates that the appended USEID(s) in section 79 is (are) to be added to the authorized list of USEIDs as an authorized access identification for exempted use data. D bit 78 deletes the appended USEID(s) 79 from the data storage system authorized list. Alternately, each USEID 79 may have an add or delete associated therewith such that concatenation of USEIDs is not limited by the add or delete function. The data storage system authorized list is preferably on a device-oriented basis; accordingly, each DCB 61 for the respective DASDs 14 have separate lists. When the data storage system detects an error in system control data, as set forth in FIG. 5, there is a potential undetectable loss of exempted use data, i.e., data integrity is questionable. At this time, the data storage system removes all USEIDs from all of the DCBs 61. Such removal blocks access to all exempted use data in cache 15. This action ensures that each computer process involved with the exempted use data at the time of errors in the control data (FIG. 5 data structures) will be properly notified whenever that computer process involved with the authorized USEIDs attempts any access to data storage areas related to such exempted use data. Further, the USEID list authorized for the diverse DASDs 14 is also in volatile data storage. Such list is erased by any power failure or IML (initial microcode load) of the programmed processor.

When an ERC channel command is received by the data storage director 12, the USEID in section 73 is compared with the authorized list. If the USEID of the ERC command is on the authorized list, then appropriate ending status is provided to using units 10, and the processing of the chain of commands continues. At this time, data storage director 12 has not suffered any failures which would cause an undetectable loss of exempted use data because a given particular computer process identified by the USEID has only established its authorization by the ERC command to use exempted data. A practical effect of the ERC command is to convert retentively stored data referenced by commands in the ensuing chain to exempt data. Similarly, exempted data identified within a defined extent is a conversion of retentive data to exempt data. Accordingly, such computer process is exempted from the error-reporting procedures relating to loss of control data which occurred prior to receipt of an EUA channel command. If the USEID of section 73 in the ERC command is not on the authorized list, then an error condition is presented as final status of this command, and execution of the chain of commands is aborted pending establishment of authorization. This situation also indicates a possible failure, i.e., loss of the authorization list due to some error condition which has not been detected or reported. In other words, a computer process should not send an ERC channel command until an EUA channel command has established authorization in the data storage system for exempted use data for the given USEID. This procedure forces recovery on the related computer process for ensuring integrity of all control data related to cache 15 exempted use data.

The third new channel command is an ALTER DATA STATUS (ADS) command including command section 81 identifying ADS, a commit bit C 82 which commits exempted use data from volatile data to retentive use data and D bit 83 which indicates discard of exempted use data which the computer process is transiently storing in cache 15. Alternately, a separate DISCARD command could be used with ADS applying only to volatile data. TK section 84 indicates the number of record tracks of DASD 14 involved in the data status altering operation to be executed in response to the ADS command. USEID section 85 identifies the computer process or its individual application. Sections 86 and 87 respectively indicate the DASD 14 addresses of the upper and lower limits of the functions to be performed by the data storage system as indicated in bits C 82 and D 83. Accordingly, the ADS command enables the data storage system to selectively convert volatile data to retentively stored data or erase transiently stored data from cache 15. To permit the data storage system to execute the ADS command, the USEID section 85 must match up with a list of USEIDs in the appropriate DCB 61. Absence of the USEID in the authorized list results in an error condition being reported to the using units 10 by the data storage system. If an error occurred since the computer process identified by USEID 85 had sent the EUA command, that error is reported to the appropriate computer process. If USEID 85 is on the authorized list and there is no error in the control data, then a so-called CHANNEL END is supplied to using units 10 to free the input/output channel for other transfers. Then the command is executed. Upon completion of command execution, a DEVICE END is supplied to one of the using units 10 indicating successful completion. When the data storage system determines whether or not the cache 15 copies of data for any of the record tracks indicated in sections 86 and 87 were modified (written into) and have not yet been supplied to DASD 14, for a commitment to retentive data (C bit 82 is unity) that data is recorded onto DASD 14 and then a DEVICE END is presented to the appropriate using unit 10. All such data then is retentively stored data. For transiently stored data, the directory 28 entry corresponding to the identified data as stored in cache 15 is erased, destroying addressability of the cache 15 corresponding data. At that point, DEVICE END is supplied to the appropriate using unit 10. In the event that cache data promotion and replacement control 24 had moved a copy of the cache 15 exempted use data to DASD 14 prior to receipt of the ADS command, then no action occurs as to that data stored in DASD 14. Such data may still reside in cache 15 or may have been replaced with the sole copy stored in DASD 14. The dual copies, i.e., a copy in both cache 15 and DASD 14 (demotion), result from moving data from cache 15 to DASD 14 prior to any cache replacement requirements. Such early demotion of data eliminates the need for demoting data when a replacement requirement in cache storage occurs, hence improving data storage system performance.

The sequence of events using the above-described channel commands within a plurality of chains of commands finds channel command EUA being performed first for establishing authorization within the data storage systems for storing exempted use data in cache 1. When a given chain of commands is to use such exempted use data, then the ERC command precedes all accesses to such exempted use data. When extent section 74 is used with the ERC channel command, the exempted use data is limited to that extent. In the event the ERC channel command does not include an extent 74 identification, then all data accesses within a given command chain identified by the ERC channel command are considered by the data storage system to be exempted use data. Upon completion of that command chain, the actual extent of such data accesses defines the respective areas 17, 18 or 19 (FIG. 1). A defined extent within cache 15 (either using cache or DASD addressing) could be defined as containing exempted data independent of USEID. After one or more ERC channel commands have been executed in a series of chains of commands, the computer process may desire to change the status of the data from exempted to retentive or from exempted to be discarded. Then, the ADS channel command is used as above described. Upon detection of an error blocking access to exempted use data, an EUA command sent by a using unit 10, after its computer process has recovered from the error, reestablishes access to the exempted-use-related data storage areas.

Data structures usable for incorporating the present invention into the FIGS. 2 and 3 illustrated data storage system are shown in simplified form in FIG. 5. It is to be appreciated that other data structures are necessary for operation of a practical data storage system; those other data structures are not necessary for an understanding of the present invention. Directory 28 contains data structures associating addressable data storage areas in cache 15 with addressable data storage areas in DASD 14. All data addresses in the data storage system are based upon the DASD 14 addresses. The directory 28 enables programmed processor 51P to determine whether or not a copy of data stored in DASD 14 has been stored in cache 15, or at least has an addressable data storage area allocated for storing such data. Other control data structures are also in directory 28, such as LRU list 29. Since cache 15 has a relatively large data storage capacity, addressing the cache can be achieved by using known address hashing techniques. The device addresses of DASD 14 are categorized into groups called hash classes. Within OP 45P (FIG. 3) is a program that identifies the hash class for each of the DASD 14 data storage addresses received from using units 10. A scatter index table (not shown) relates the hash classes to directory 28 registers within system store 57. Each of the directory 28 registers includes an HL Section 90 which stores a hash link pointer indicating another register of directory 28 within the same hash class. The last register in the hash-linked list for each hash class contains all zeros in its HL section 90. Accordingly, a received DASD 14 address results in the hashing process followed by indexing to directory 28 via the above-mentioned scatter index table to a register of directory 28 for identifying a first addressable data storage area of cache 15, possibly containing data related to the received DASD 14 address. DADDR section 91 contains the DADDR (DASD 14 address) of the data stored in cache 15. If there is a match between DADDR stored in section 91 and the received DADDR, then that data relatable to DADDR is currently stored within cache 15 and a cache hit occurs. If there is a miscompare, then the next register in directory 28 is examined until the last register having an HL=0 is found. If there is no match within the hash class, then a cache miss has occurred, i.e., no addressable data storage area of cache 15 has been allocated for the received DADDR. The address of the data storage area in cache 15 is spatially related to the directory 28 register addresses; that is, a predetermined number of data storage areas reside in cache 15. There are a number of registers in directory 28 equal to the number of cache 15 data storage areas. Each directory 28 register is uniquely associated with each of the respective data storage areas in cache 15 and hence, through a simple address manipulation, the data storage area is addressed. Alternately, directory 28 could contain a cache 15 pointer for each of the cache 15 data storage areas.

LRU 29 includes backwards pointers BP 92 and forward pointers FP 93 to constitute a doubly-linked list of addressable data storage areas of cache 15. Each BP 92 contains an index to a directory 28 register which identifies a data storage area of cache 15 for containing data which is a next-least-recently-used set of data with respect to the data indicated by the respective register of directory 28. In a similar manner, each FP 93 contains an index to a directory 28 register which identifies a data storage area of cache 15 for containing data which is a next-most-recently-used (MRU) set of data with respect to the data represented by the instant directory 28 register. Diverse known algorithms may control the ordering of the LRU 29 doubly-linked list.

E section 94 is optional and represents whether or not the data in the identified cache 15 data storage area is exempt data or retentively stored data. M bit 95 indicates whether or not the contents of the indicated data storage area in cache 15 is modified from or different from the copy of data stored at the corresponding DASD 14 address indicated in section 91. Of course, it is to be understood that additional entries in each of the registers of directory 28 may be employed in a practical embodiment. Please note that E bit 94 is optional; the existence of exempted use data in cache 15 need not be separately tagged.

DCB 61 contains data structures for each of the DASDs 14 useful for operating such DASDs with respect to using units 10. In addition to the control data fields illustrated in FIG. 5, there are other control data fields associated with rotational control (such as sector identifications and the like) and other control data useful for operating a data storage system employing such devices but not pertinent to an understanding of the present invention. Those fields have been omitted for clarity in understanding the present invention. Section 100 contains a list of all USEIDs set up by the EUA channel command described with respect to FIG. 4. When USEIDs are global (for all devices), a list of USEIDs separate from DCBs is employed. Section LL 101 contains a linked list for tying together various portions of DCB 61 for a given DASD 14 within control store 59. There is one linked list for each of the DASDs 14 attached to a control unit 12. E bit 102 indicates whether or not exempted use data in cache 15 is associated with the addressing of data storage systems identified through the respective DASD 14. That is, all addressing within the data storage system is based upon DASD addresses even though the addressing can be limited to cache 15. The extents of the exempted data are optionally indicated in sections 104 and 105 respectively by the lower and upper address bounds based upon DASD 14 addresses. There may be a plurality of such extents for each of the devices 14. Such extents in a preferred form exist through a plurality of chains of channel commands; each channel command chain working with such exempted use data includes an ERC channel command (FIG. 4). Numeral 103 identifies ellipses signifying the omitted control data fields. Sections 106 and 107 are optional for respectively indicating transient and volatile data subclasses of exempted use data. Such indications can be used in connection with cache data promotion and replacement control 24 such that volatile data indicated by bit 107 is moved to a DASD 14 prior to moving any transient data indicated by T section 106. The indications of volatile or transient data are controlled by the ERC command T and V bits 72T and 72V, respectively. In a single preferred embodiment, the last-received ERC command determines T or V status.

Since a plurality of exempted use extents can occur for a given USEID, for each USEID in a DCB 61, the extents represented by numerals 104 and 105 can be stored as an extent table 110. Table 110 is also used in connection with the ADS command as explained with respect to FIG. 7. Table 110 includes a header having section extent count 111 (EXTENT K) which indicates the total number of extents for a given USEID. A second portion of the header is loop counter 112 (LOOP K) which is normally set to 0 but counts the scanning of the extents, as will become apparent. Area 113 identifies the upper and lower DASD 14 addresses for the areas 17, 18 and 19 relating to respective USEIDs. In a variation of the present invention, a USEID can apply to all DASDs 14 rather than to a single DASD 14. In this instance, there is one USEID associated with a table 110 for a plurality of DASDs 14. In that instance, the extent indications 113 include the device address of the respective DASDs 14. Even with the organization of USEIDs as shown in FIG. 5, wherein the listings are by device address, the same USEID can be applied to a plurality of DASDs 14. Accordingly, when scanning the USEID extents defined by device address, the scan can include a plurality of DCBs 61. As stated before, access control for exempted use data may be by USEID, by address extent or by both a USEID and address extent.

FIGS. 6 and 7 are machine operations charts illustrating execution of the channel commands illustrated in FIG. 4. A command is received and decoded at 120 by ACE 52P. Then a logic path 121 is followed by processor 51P in accordance with that decoding to execute: an EUA command at 122; an ERC command at 134; a data-access-type command (READ or WRITE—R/W) at 140; an ADS command at 152; or a MODE SET command at 169. With respect to exempted use data, the channel command EUA is first executed by the data storage system for establishing exempted use authorization. Such authorization may represent an initial intent by a using unit 10 to use the storage system with exempted use data, or it may be part of a recovery from a prior loss of exempted use data. From path 122 processor 51P executes machine step 126 by examining the received EUA command A and D sections 77 and 78 (FIG. 4). When A section 77 is equal to 1, processor 51P at 127 accesses the DCB 61 corresponding to the DASD 14 identified in DADDR section 75 to add the USEID set forth in section 79 to DCB 61 section 100. Please note there may be a plurality of USEIDs in section 79. In the event an error occurs during such accessing, processor 51P follows logic path 128 to later-described step 131. Upon the completion of step 127, processor 51P goes over logic path 130 to perform some postcommand executing steps 147–151, which will be later described. When D bit 78 equals one at machine step 126, processor 51P executes step 131 by accessing DCB 61 corresponding to the DADDR section 75 and by deleting the USEIDs from section 100 identified in section 79 of the EUA command (the EUA command may include an ALL option for deleting all USEIDs without identifying same). Following step 131, logic path 130 is followed to the postcommand operations. If both A and D are unity or zero, the command is in error. This error is signalled to the host. For signalling the error to the host 10, processor 51P follows path 123 to path 124, thence to error status step 125. From step 125, processor 51P goes to report ending status via path 130, as later described.

The second command executed in the series of channel commands set forth in FIG. 4, which is executed each time a chain of commands is to operate on exempted use data in the data storage system, is the ERC command. Processor 51P follows path 134 to machine step 136 to compare the USEID received in section 73 with the USEIDs stored in section 100 of DCB 61. For a noncompare, an error is to be reported to the using unit 10; accordingly, processor 51P proceeds over logic path 124 to step 125. For a favorable compare between the USEIDs in sections 73 and 100, processor 51P at 137 sets E bit 102 to unity to indicate that exempted use data is the subject of the current chain of commands relating to the addressed DASD 14 identified in section 70 (FIG. 4). Also, with an appended extent field 74, the extent fields 104, 105, which of course can be in the table 110, are updated. When the USEID relates to but a portion of the data storage space of a given DASD 14, then a separate E bit is provided for each such portion. Then, at 138 certain nonpertinent functions can be performed, leading processor 51P to the later-described postcommand execution steps.

The data-access commands, such as a READ or WRITE, occur at 140. At step 141 some preparatory steps incident to reading or writing are performed which are not pertinent to an understanding of the present invention. Such steps are those steps performed in a control unit 12 with present day DASD data storage systems. Then at 142, processor 51P examines DCB 61 for the addressed DASD 14 to see if the E bit 102 is set to unity, i.e., the present chain relates to exempted use data. If not, then normal data transfers immediately follow at 146 such as accessing cache 15 to transfer data, or accessing DASD 14 to transfer data, and the like. For exempted use data and when directory 28 optionally has a tag indicating exempted use data, then directory 28 is accessed to examine E bit 94. If the E bit 94 does not correspond with the DCB 61 E bit 102, an error is indicated via path 124. For equality, normal processing occurs for exempted use data. When directory 28 does not contain E bit 94 (the preferred implementation), step 143 is dispensed with. For handling exempted use data in the preferred embodiment, the USEIDs had already been compared at machine step 136 in executing the ERC channel command.

When erasure of USEIDs indicates detection of a control error (a preferred mode), then in step 143 the DCB 61 USEID section is examined. When USEIDs are zero, then step 144 is executed to erase all DCB sections 100 to ensure no access to any exempted use data until appropriate using unit recovery can occur. Following step 144, logic path 124 is followed to error status step 125.

Following step 142 or 143, processor 51P at step 145 examines the extent indicated in DCB 61 to determine if the address associated with the received access command is within the DCB 61 stored extent. If not, an error condition has occurred and path 124 is followed to accumulate error status at 125. Otherwise, processor 51P proceeds to the data transfer steps generally indicated by numeral 146 which transfers data between cache 15 and using units 10 or as otherwise indicated in the FIG. 8 machine operations chart. Following the data transfers at step 146, which normally include parity error checking on the quality of data transfer, in the event an error did not occur during the transfers at step 146, processor 51P at step 143A finds no error and then proceeds over logic path 130 to postcommand processing. In the event of a detected error, processor 51P at 142A checks DCB 61 E bit 102 to see if exempted use data is employed. If the error does not relate to exempted use control data, then error status step 125 is immediately entered via logic path 124. This action allows the using unit 10 to employ an EUA command for controlling access to the data in error. Otherwise, at step 144 the USEID of section 100 of the appropriate DCB 61 is erased to zero. Please note that in step 144 entry from step 143 results in erasing all the USEIDs in all DCBs 61, whereas entry from step 142A results in erasing only the affected USEIDs in the DCB 61 corresponding to the addressed device 14, then error status step 125 is executed.

Upon completion of one or more chains of commands or within a chain of commands involving exempted use data, which is authorized by the initial execution of the ERC channel command followed by one or more data access commands, the alter data status command ADS can be executed to either convert the exempted use status data to retentively stored data or discard the transient data from the data storage system. Following command decoding at step 120, processor 51P at step 153 (FIG. 7) may perform some initial error checking functions not pertinent to an understanding of the present invention. Then at step 154, processor 51P compares the USEID in section 85 of the received ADS command with the USEIDs of section 100 of the associated DCB 61. If one of the USEIDs equals the received USEID, the command is executed; otherwise an error status is reported via path 124 and the command is not executed. With equality of the USEIDs at step 154, processor 51P at step 155 examines TK section 84. If that section has an extent of zero, an error is indicated via logic path 124. Otherwise, at step 156 bits C 82 and D 83 of the ADS command are examined. If both bits are ones or zeros, an error is indicated via logic path 124. If the EXCLUSIVE-OR function is satisfied (either C or D are equal to one but not both), then at step 157 the value contained in TK section 84 and the extent defined in sections 86 and 87 of the ADS command are stored in control store 59 in tabular form as shown with respect to table 110. Then, processor 51P at step 158 determines which function is to be performed, i.e., commit the exempted use data to retentively stored data or discard exempted use data from the data storage system cache 15. For a commit-to-retentive-storage function, at step 160 directory 28 is scanned using hashing addresses for all of the extents defined in the received ADS channel command. The extents 104–105 corresponding to extents 86–87 of a prior ADS command, of table 110 (FIG. 5) and the TK values determine the number of DASD 14 tracks to be scanned in step 160. When the cache 15 data is tagged as being exempted use in bit 94, that bit is reset to zero. In a preferred mode, the E bit 94 does not exist. For each identified set of data stored in cache 15, the M bit 95 is examined. If the M bit equals one, the data stored in cache 15 is scheduled for demotion to DASD 14 to make the two copies of the data congruent. The directory 28 scan includes examining each and every DASD 14 address within the extent between the lower and upper limits for data contained in cache 15. The scheduling of data demotion constitutes establishing a queue of data blocks to be transferred from cache 15 to DASD 14. Such queues are stored in control store 59 and are not separately illustrated because listing of addresses in a queue is well known.

Upon completion of a scan within a first extent, loop counter 112 is incremented by unity for identifying the next extent to be scanned in a subsequent step 160. At step 162, the value of the loop count, as incremented, is compared with the value in extent count 111. When the loop count is not greater than the extent count, the loop consisting of steps 160 and 161 is repeated. When the loop count in section 112 is greater than the extent count in section 111 of table 110 (FIG. 5), then all scans have been completed. Parameters included in the received ADS command may be used to control scan operations. For example, the number of and which extents are to be altered are specified. Other extents are not altered by such received command, i.e., only a portion of the exempt data under a given USEID need be altered. Processor 51P then transfers all of the data identified in the FIFO (first in first out) queues established in control store 59 from cache 15 to DASD 14. Such transfers follow the same data transfer techniques at step 163 as used by a host processor for transferring data from main memory to a direct access storage device which does not have a cache. Since such techniques are so well known, detailed descriptions thereof are dispensed with. Upon completion of all those data transfers, which are done asynchronously to using units 10 operations and are indicated by the FIFO queue being zero, processor 51P proceeds to machine step 164 wherein it accesses the appropriate DCB 61 to reset E bit 102 to zero as well as all of the extents in sections 104 and 105.

To free I/O connection 11, a CHANNEL END is given at step 157. DEVICE END is primed by setting a flag bit (not shown) such that, upon completion of the steps 160–168 and establishment of congruence, a DEVICE END is sent to using units 10 in a usual manner. Following steps 164 or 168, command postprocessing steps 147–151 follow.

For a discard function being indicated at machine step 158, processor 51P discards the data indicated in the extents of the received ADS command sections 86 and 87 via scanning directory 28 in steps 165, 166 and as described for steps 160 and 161. Instead of demoting data from cache 15 to DASD 14, the ADS command identified directory 28 entries are all reset to zero for destroying the addressability of the identified data storage areas in cache 15; that is, within the extents identified in table 110 for each hit, within cache 15, that corresponding directory 28 entry is erased. The corresponding identifications of data storage areas of cache 15 are then removed from LRU 29 and placed upon a free list (not shown) which is used by an allocation control (not shown) within OP 45P for allocating addressable data storage areas of cache 15 for data to be stored in the cache. Step 167 is identical to step 162. At step 168 processor 51P accesses the appropriate DCB 61 and erases the extent indications in sections 104 and 105 (erases the table 10). Then the postcommand steps 147–151 shown in FIG. 6 are performed.

In FIG. 4 it was indicated that the ERC channel command could contain an extent field 74. In some data processing systems, a so-called DEFINE EXTENT command exists. This command can be used to set the extents for the ERC command. That is, the first command in a chain of commands is a DEFINE EXTENT command which not only defines the extent but also establishes mode sets not pertinent to an understanding of the present invention. The DEFINE EXTENT command is followed by the ERC command for indicating exempted use data in the chain. A received mode set command which precedes the previously described ERC command results, as shown in FIG. 7, in execution of nonpertinent steps 169 with respect to mode setting the data storage system in accordance with previously known commands. At step 170, an extent for defining an area 17 (FIG. 1) of cache 15 for example, is established. The fact that such undefined extent relates to exempted use data can be defined by a subsequently received ERC channel command. Upon completion of mode setting, processor 51P follows path 130 to the FIG. 6 illustrated postcommand processing steps 147–151.

The postcommand processing steps shown in FIG. 6, include reporting ending status at 147. This reporting usually includes CHANNEL END and DEVICE END tags with associated status, i.e., error status or status indicating no errors. At step 148, processor 51P through channel adaptor 50 examines the input/output connection 11 for the SUPPRESS OUT signal (SUPPRO). If the SUPPRESS OUT signal has been received when ending status is to be reported at step 147, a continuation of the current chain of commands is indicated. Accordingly, processor 51P then proceeds to some nonpertinent postcommand processing steps at step 151 in preparation for receiving the next command in the instant chain of commands. When the SUPPRESS OUT signal is not supplied at ending status time, the chain of commands is being terminated. At this time, at step 149 processor 51P examines the appropriate DCB 61 and resets the E bit 102 to zero. Remember the ERC command at step 137 caused the E bit 102 to be set to unity for indicating exempted use data operations for the instant chain of commands. At this time, processor 51P may also provide some postchain data promotions as described with respect to the FIG. 8 machine operations chart. In a preferred form, such promotions can await the receipt of a command in a next chain of commands such that data promotions do not occur until there is a need for such data by a using unit 10. Accordingly, when the subsequently received command is decoded at step 120, such postchain data promotions may occur at step 150. In this instance, the data storage system supplies a channel command retry (CCR) signal to the using unit 10 indicating that before the received command can be performed, some data storage system functions have to be performed, i.e., the postchain promotions. Following step 149 other postcommand operations are performed at step 151. Then processor 51P awaits the receipt of a next chain of commands or performs other asynchronous operations not pertinent to an understanding of the present invention.

The data storage system, via its processor 51P, performs diverse diagnostics and error checking coincident or simultaneously with data transfers and during idle times. Such error checking is usually handled through a dispatcher (not shown) which, in the normal course of data processing operations, coordinates execution of the various programs in control store 59, as is well known. FIG. 7 illustrates a simplification of a diagnostic program which is asynchronously actuated through such a dispatcher. At step 200, various diagnostic procedures for verifying successful operations of the various component parts of the data storage system occur. At step 201 the control data structures in control store 59 are examined as well as successful operation of control store 59. As an example, each data byte stored in control store 59 has an appended parity bit. A parity error indicates an error in the control data structures. Other error detection codes may also be employed. When a control error is detected at step 201, DCBs 61 are accessed at step 202 for erasing all USEIDs 100 such that any subsequent attempted access to exempted data in cache 15 results in an error condition being detected, such as detected at steps 136 and 154. Please note that the error condition can be signified by erasing the USEIDs and in conjunction other error flags (not shown) indicate the location of the error condition for facilitating recovery. In a plural processor environment, the USEIDs can be a shared data structure in system store 57; otherwise all processors at step 202 must erase their USEID copies.

The operational relationship between cache 15 and DASDs 14 for retentive and exempted use data are preferably identical; i.e., data promotions from DASDs 14 to cache 15; handling cache misses, replacement (see control 24 of FIG. 1), etc., preferably ignore the use status of data. While such controls may take such use characteristics into account (viz transient and volatile data distinctions), the data storage controls are simplified when such use status is ignored.

FIG. 8 illustrates machine operations for data access commands resulting from monitoring steps 146 of FIG. 6. The FIG. 8 illustration assumes that programmed processor 51P has received a data storage access request, such as at step 140 in FIG. 6, and has completed steps 142, 143 and 145. FIG. 8 details steps 146. In FIG. 8, at step 171, programmed processor 51P via DAC 53P portion examines CD bit 20 to determine whether cache 15 or the addressed DASD 14 is to be accessed. For a cache C access programmed processor 51P searches directory 28 at step 172 to see if the track or record requested in the received command has space allocated in cache 15. Searching directories for determining contents of cache or other memories is well known and not detailed for that reason. In this regard, it is noted that some host-issued commands will require a direct connection to DASD 14. Accordingly, ACE 52P, in detecting such a peripheral command, sets bit 20 for the addressed DASD 14 to the direct mode. An example of such a peripheral command is to recalibrate a DASD 14. Searches and SEARCH ID EQUAL commands can be performed for cache within directory 28, i.e., the commands are performed in a virtual manner not involving any DASD 14. In the constructed embodiment, directory 28 did not separately identify records in a track; only tracks were identified, no limitation thereto intended. Upon completion of the directory search, programmed processor 51P at step 173 determines whether or not a cache hit has occurred. If a cache hit occurred, which is preferred for performance reasons, programmed processor 51P follows logic path 175 to access cache 15 at step 174 for transferring data between a using unit 10 and cache 15 using known data transfer techniques. Upon completion of that data transfer, programmed processor 51P returns through logic path 185 to logic path 130 of FIG. 6.

When a cache miss occurs at step 173, the direct mode of data transfer is set at step 176. This means that using units 10 will transfer data directly with DASD 14 within the cylinder of tracks and for the continuation of the particular chain of commands, independent of whether or not space is allocated in cache 15 for any of the data transfers (cache bypass). Once bit 20 for the addressed DASD 14 is set to the direct state, any subsequent received commands following step 171 will follow logic path 177 to join the exit of step 176 for directly accessing DASD 14; for tallying the accesses to DASD using write commands at step 178 (no tallying for read commands, no limitation thereto intended); or for accessing DASD 14 for data transfers, then updating the least-recently-used linked list LRU 29 for cache replacement control, as is well known. The address of the track/record to be written into the addressed DASD 14 for each write command is stored in device access tally 23 for later described post-chain/post-cylinder operations 149. Upon completion of the command execution by executing step 178, programmed processor 51P reports final status at step 179 to the appropriate using units 10 (see step 147 of FIG. 6).

Upon posting final status, programmed processor 51P then determines whether or not there is a change in operations as detected in steps 180. These operation change checks may be performed upon sending final status to using units 10 or upon receiving a next peripheral command (as at step 150 in FIG. 6) but before execution of such next peripheral command. A first check at step 181 checks for end of the chain (EOCH) (same step as step 148 in FIG. 6) which is detected by the absence of SUPPRESS OUT tag signal at final status time or at step 147. The second check at step 182 is for the end of the cylinder (EOCYL): that is, all of the tracks within a cylinder have a predetermined address space, tracks 1 through 17, for example. Depending upon the addressing increment direction, i.e., completion of an access to a track at step 178, the next track can be in an adjacent cylinder or within the same cylinder. If the next track to be accessed is expected to be in an adjacent cylinder (e.g., a SEEK command was received), then at step 182 programmed processor 51P indicates end of cylinder. The third check at step 183 is for out of bounds (OOB). It is common practice in present day DASD peripheral systems to have a DEFINE EXTENT command received from a using unit 10. A DEFINE EXTENT command establishes a range of addresses which defines bounds of permitted data accesses. Accordingly, if programmed processor 51P in processing the peripheral command at step 178 indicates that the address being processed is beyond or at the boundary of the defined extent, then an out-of-bounds condition occurs, i.e., the next desired access will be outside of the previously defined extent, and is not allowed. A fourth check at step 184 is for a received command decoded by step 120 which is a device (DASD) related command (DVE MECH CMD). This type of command includes the RECALIBRATE command as used on present day DASD and usually requires a mechanical (MECH) action by the DASD.

If all of the steps 181–184 indicate no change in operation, then programmed processor 51P follows path 185. If any one of the conditions set forth for steps 181–184 is met, then programmed processor 51P follows logic path 190 to step 191 for resetting bit 20 to the C state. Then at step 192, programmed processor 51P in step 193 scans cache bound list 60 and compares each entry in the cache bound list with the contents of device access tally 23. For each hit, i.e., favorable comparison, programmed processor 51P actuates the peripheral system to transfer data from the addressed DASD 14 to cache 15; that is, data stored in a track on DASD 14 was changed while corresponding data stored in cache 15 was bound to that cache, resulting in the cache-stored data being outdated. Therefore, for ensuring congruence and data integrity, cache 15 is updated to correspond to the latest data stored in DASD 14. At completion of the scan or no hit, step 194 is omitted. At step 195, the tracks on DASD 14 storing retentive data which were modified in cache 15 and not bound to cache 15 are demoted from cache 15. At step 195A, whether a WRITE command is the current command is checked. When the current command is not a WRITE command, at step 195B the data contents of the DASD copy of the last track referenced (LTR) is promoted from DASD to cache; otherwise for a WRITE command, step 195B is omitted. At step 196, programmed processor 51P examines a sequential bit (not shown) to see whether or not a using unit 10 had indicated that the previous storage requests were indicated as being sequential data, i.e., a using unit 10 is using the data in the batch mode such that sequential processing occurs as opposed to interactive modes where partitioned data sets or random accesses to stored data occur. For read operations with sequential data, programmed processor 51P at step 197, promotes the entire contents of the DASD track immediately following the last track accessed in the addressed DASD 14 to cache 15. For purposes of brevity, the sequential indicator is not shown in the drawing; it is a bit in control store 59 of programmed processor 51 for each of the DASDs 14.

In the above-described operations, accessing a DASD 14 ensures recording data from using unit 10 into the retentive store of DASD 14 as quickly as possible, thereby avoiding transferring the data to cache and then from cache to DASD 14 whenever orientation of the DASD 14 has been established and whenever allocation is required in cache 15. It is to be understood that additional controls for managing data contents of cache 15 can be employed and can operate independently of the exempted use status. This independence still ensures efficient replacement controls for cache 15.

While the invention has been particularly shown and described with reference to preferred embodiments thereof, it will be understood by those skilled in the art that various changes in form and details may be made therein without departing from the spirit and scope of the invention.

What is claimed is:

1. In a data-storage hierarchy for being connected to a host processor having a plurality of computer processes for data processing operations and the hierarchy having a rapid-access front store and a slow-access back store; data transfer means coupled to said host processor and to said front and back stores to automatically transfer data therebetween, each store having a plurality of addressable data storage areas;

the improvement including, in combination:

commitment control means for receiving and storing commands from the host processor indicating for each of said addressable data storage areas in said front store either a first type of data receivable from the host processor which is committed to be retentively stored by said hierarchy or for each of said addressable data storage areas in said front store a second type of data receivable from the host processor which is to be exempted from said retentive storage commitment, change means in said commitment control means responsive to the commands received from the host processor for changing said indications for any one of said addressable data storage areas in said front store and connected to said data transfer means for actuating the data transfer means to transfer data between said front store to said back store in accordance with said changed indications; and data storage control means coupled to said commitment control means and to said data transfer means and having first means for being responsive to the first type of data for storing such received first type of data in said back store and in said front store when access by said host-processor to such first type of data is to be enhanced and having second means for being responsive to the second type of data for storing such received second type of data in said front store.

2. The data-storage hierarchy set forth in claim 1 wherein said first means includes incongruent means connected to said front store and to said back store for being responsive to said data storage control means causing host-processor-supplied first type of data to be stored in said front store and for generating a lack-of-congruence indication for indicating a lack of congruence between said supplied first type of data and the first type of data currently stored in said back store, and includes means coupled to said incongruent means for responding to said lack-of-congruence indication indicating a lack of congruence for transferring first type of data between said front and back store for ensuring congruence between said supplied first type of data stored in said front store with corresponding first type of data stored in said back store.

3. The data-storage hierarchy set forth in claim 1, further including, in combination:

front store access control means having criteria means for supplying indications of predetermined criteria indicative of a plurality of logical relationships of said second type of data stored in said front store to any host processor access attempt to said stored second type of data for limiting such host processor accesses to given ones of said logical relationships and for allowing plenary access to said first type of data stored in said front store, and being coupled to said commitment control means and said data storage control means to limit access to portions of said second type of data in accordance with said predetermined criteria.

4. The data-storage hierarchy set forth in claim 3, further including, in combination:

use identification means coupled to said front store access control means for supplying said predetermined criteria as use identifications related to computer processes of said host processor, respectively, whereby only those computer processes having predetermined use identifications for said second type of data respectively only can access said second type of data.

5. The data-storage hierarchy set forth in claim 4, further including, in combination:

access authorization means in said use identification means for storing one or more of said use identifications respectively for portions of said second type of data.

6. The data-storage hierarchy set forth in claims 3, 4 or 5, further including, in combination:

address extent means in said access control means for storing address extents for identifying those data storage areas of said front store to be used for storing said second type of data.

7. The data-storage hierarchy set forth in claims 1, 3, 4 or 5, further including, in combination:

replacement control means in said data storage control means and coupled to said data transfer means for controlling data transfers between said front and back stores for managing data-storage-area usage in said front store and including an LRU control list of said data storage areas of said front store and listed in a predetermined order and including means for monitoring accesses to said front store for adjusting said predetermined order in accordance with said monitored accesses.

8. The data-storage hierarchy set forth in claim 7 wherein said replacement control means adjusts said LRU control list independently of whether or not said monitored accesses are related to said first or second type of data.

9. The data-storage hierarchy set forth in claim 8 wherein said commitment control means includes means for indicating transient data or volatile data as subclasses of said second type of data; and data status conversion means in said change means of said commitment control means and being coupled to said host processor and to said data storage control means for being responsive to said host processor for converting said volatile data to said first type of data and discarding said transient data from said front store.

10. The data-storage hierarchy set forth in claim 8, further including, in combination:

error detection means in said commitment control means for detecting and supplying a signal indicating an error condition, and further means in said data storage control means and coupled to said error detection means for being responsive to said supplied signal to block access by said host processor to said second type of data.

11. The data-storage hierarchy set forth in claim 1, further including, in combination:

authorization control means in said commitment control means for being coupled to said host processor for receiving a usage authorization which enables the commitment control means to indicate said second type of data; and chain command control means coupled to said authorization means and for being coupled to said host processor for receiving and storing chains of commands from said host processor to be executed by said data-storage hierarchy, including said usage authorization, and having means for transferring said received usage authorization to said authorization control means and including referencing means responsive to a reference indication that said type of second data is to be transferred between said host processor and said data-storage hierarchy and being responsive thereto to examine said authorization control means stored usage authorization for determining whether or not said second type of data is authorized and, if not authorized, indicating an error condition; if authorized, enabling said data-storage hierarchy to execute subsequently received commands from said host processor with respect to said second type of data.

12. The data-storage hierarchy set forth in claim 11, further including, in combination:

authorization control means in said commitment control means for being coupled to said host processor for receiving a usage authorization which enables the commitment control means to indicate said second type of data; and chain command control means coupled to said authorization means and for being coupled to said host processor for receiving and storing chains of commands from said host processor to be executed by said data-storage hierarchy, including said usage authorization, and having means for transferring said received usage authorization to said authorization control means and including referencing means responsive to a reference indication that said type of second data is to be transferred between said host processor and said data-storage hierarchy and being responsive thereto to examine said authorization control means stored usage authorization for determining whether or not said second type of data is authorized and, if not authorized, indicating an error condition; if authorized, enabling said data-storage hierarchy to execute subsequently received commands from said host processor with respect to said second type of data.

13. The data-storage hierarchy set forth in claim 11, further including:

command execution means coupled to said change means of said commitment control means and to said chain command control means and being responsive to predetermined commands received from said host processor via said chain command control means for activating said change means of said commitment control means to change said indication from indicating said second type of data to indicating said first type of data in response to a received first alter command and to discard said second type of data, from said front store in response to a received second alter command.

14. The data-storage hierarchy set forth in claim 13, further including, in combination:

directory means for indicating data stored in said front store with respect to said addressable data storage areas of said front store and for identifying corresponding ones of said addressable data storage areas of said back store at which such data can be respectively stored in said back store and including an indication of congruence between the copy of data stored in the front store with respect to a copy of data stored in a corresponding one of said addressable data storage areas of said back store; and said data storage control means being coupled to said directory means and responsive to a change in indication from said second type of data to said first type of data (hereafter "converted data") and without changing the informational contents of the converted data by said command execution means for transferring said converted data between said front and back stores to make a copy of said converted data stored in one of said stores in another of said stores for ensuring congruence between copies of said converted data stored in said data-storage hierarchy.

15. The data-storage hierarchy set forth in claims 11, 13 or 14 wherein said authorization control means includes means for storing USEIDs (user identifications) of respective ones of said computer processes in said host processor with said storage of said USEIDs constituting authorization for transferring said second type of data between said host processor and said data-storage hierarchy and for limiting access to said second data by said computer processes to said respective processes having said USEIDs.

16. The data-storage hierarchy set forth in claim 15, further including, in combination:
  error detection means coupled to said commitment control means and to said authorization control means for detecting an attempted access to said second type of data by a computer process other than a stored USEID-identified computer process and having means for indicating an error condition to said host processor in response to said attempted unauthorized access.

17. The data-storage hierarchy set forth in claim 16 wherein said authorization control means further includes means for receiving through said chain command control means extents of said addressable data storage areas with each of said USEIDs for identifying said addressable data storage areas which may store said second type of data with respect to each of said USEIDs.

18. The data-storage hierarchy set forth in claim 17, further including, in combination:
  replacement control means in said data storage control means and being coupled to said data transfer means for controlling data transfers between said front and back stores for managing data storage area usage in said front store and including an LRU control list of said front store data storage areas and listed in a predetermined order and including monitoring means for monitoring accesses to said front store for adjusting said predetermined order in accordance with said monitored accesses to the front store whereby data transfers between said front and back stores are independent of whether the data stored in said front store is first or second type of data.

19. In the data-storage hierarchy set forth in claim 1, further including, in combination:
  exempt data access control means connected to said commitment control means and to said front store for storing an identification element which indicates authorized access to said exempt data stored in said data-storage hierarchy, stored either in said front or said back store;
  ID means connected to said data storage control means for receiving and storing commands supplied by said host processor including commands requesting access to said exempt data, said commands also including an access identification;
  compare means connected to said exempt data access control means and to said ID means and to said data storage control means for comparing said access identification with said identification element and being responsive to a predetermined comparison to actuate said data storage control means to enable access to said exempt data and operative to indicate an error to the host processor whenever said comparison is other than said predetermined comparison;
  error control means connected to said front store and to said ID means for detecting errors in said front store and operative upon detecting an error in said front store to actuate said ID means to erase said identification element for preventing access to said exempt data;
  host communication means connected to said ID means, said data storage control means and to said error control means for communicating said detected error to said host and for receiving a new identification element from said host for re-enabling access to said exempt data after detecting and reporting an error in the front store.

20. The data-storage heirarchy set forth in claim 1, wherein said commitment control means includes means for indicating transient data or volatile data as subclasses of said second type of data; and
  data status conversion means in said change means of said commitment control means and being coupled to said host processor and to said data storage control means for being responsive to said host processor for converting said volatile data to said first type of data and discarding said transient data from said front store.

21. The data-storage hierarchy set forth in claim 1, further including, in combination:
  error detection means in said commitment control means for detecting and supplying a signal indicating an error condition, and further means in said data storage control means and coupled to said error detection means for being responsive to said supplied signal to block access by said host processor to said second type of data.

22. In a data-storage hierarchy for being connected to a host processor and having a volatile front store and a retentive back store with data transfer means for transferring data signals therebetween, each store having a plurality of addressable data storage areas with means to address same;
  the improvement including, in combination:
  data integrity control means for indicating for each of said addressable data storage areas of said volatile front store which data stored in said volatile front store is to be retentively stored and which data stored in said front store is exempted from said retentive storage within said data-storage hierarchy, change means in said data integrity control means for changing said indications for any of said data stored in said volatile front store addressable data storage areas between an exempted indication and retentive indication and connected to said data transfer means for actuating the data transfer means to transfer data between said front store to said back store in accordance with said changed indications; and
  hierarchy control means connected to said data transfer means, to said front and back stores and to said data integrity control means and being operative for ensuring congruence between data stored in said front and back stores which is retentively stored data and having error control means for detecting and indicating error conditions that are related to said exempted data independent of any congruence or differences between copies of such exempted data stored in said front and back stores within said volatile front store and for reporting the detected and indicated error conditions to said host processor.

23. The data-storage hierarchy set forth in claim 22 wherein said data integrity control means includes memory means for storing use indications for identifying respective permitted accesses to said data-storage hierarchy related to said data exempted from said retentive storage and having exempted data access means responsive to said stored use indications for limiting access to said exempted data to those data-storage-hierarchy accesses identified by said stored use indications.

24. The data-storage hierarchy set forth in claims 22 or 23, further including, in combination:
   said data integrity control means having means for indicating whether said exempted data is transient data to be discarded upon completion of first predetermined data storage operations or volatile data which identifies that exempted data to be retentively stored upon completion of second predetermined data storage operations.

25. The data-storage hierarchy set forth in claim 22 wherein said hierarchy control means further includes replacement control means coupled to said data transfer means for controlling data transfers between said front and back stores for managing usage of said data storage areas in said front store and including an LRU control list of said data storage areas listed in a predetermined order and including means for monitoring accesses to said front store for adjusting said predetermined order in accordance with said monitored accesses.

26. The data-storage hierarchy set forth in claims 22, 23 24 or 25, further including:
   means in said data transfer means for enabling access by said host processor to said back store for responding to a request received from said host processor.

27. The data-storage hierarchy set forth in claims 22 or 25, further including:
   means in said hierarchy control means for indicating an extent of said addressable data storage areas of said back store accessable during a given access by said host processor, addressing means in said hierarchy control means connected to said front store for addressing said front store using addresses of said data storage areas of said back store, including means for limiting access to said extent whether the data usage is retentive or exempted from said retentive storage and including use control means for limiting access to said exempted data stored in said front store within said extents for predetermined uses only.

28. The data-storage hierarchy set forth in claim 22 wherein said data integrity control means and said hierarchy control means further include means for selectively being coupled to said host processor for receiving control signals from said host processor for adjusting said retentive or exempted indications whereby stored data is exempt or retentive as indicated by said host processor.

29. In the data-storage hierarchy set forth in claim 18, further including, in combination:
   exempt data access control means connected to said data integrity control means and to said front store for storing an identification element which indicates authorized access to said exempted data stored in said data-storage hierarchy, stored either in said front or said back store;
   ID means connected to said hierarchy control means for receiving and storing commands supplied by said host processor including commands requesting access to said exempted data, said commands also including an access identification;
   compare means connected to said exempt data access control means and to said ID means and to said hierarchy control means for comparing said access identification with said identification element and being responsive to a predetermined comparison to actuate said hierarchy control means to enable access to said exempted data and operative to indicate an error to the host processor whenever said comparison is other than said predetermined comparison;
   error control means connected to said front store and to said ID means for detecting errors in said front store and operative upon detecting an error in said front store to actuate said ID means to erase said identification element for preventing access to said exempted data;
   host communication means connected to said ID means, said hierarchy control means and to said error control means for communicating said detected error to said host and for receiving a new identification element from said host for re-enabling access to said exempt data after detecting and reporting an error in the front store.

30. In a peripheral data-storage system for being connected to a host processor and having a volatile front store and a retentive back store with data transfer means to transfer data therebetween, each store having a plurality of addressable data storage areas;
   the improvement comprising:
   data integrity control means for indicating which data stored in any one of the addressable data storage areas in said volatile front store is retentively stored and which data stored in any one of said data storage areas of said volatile front store is exempt from being retentively stored within said peripheral data-storage system, change means in said data integrity control means for changing said indications between said exempted indications and said retentive indications for any of said data storage areas of said volatile front store and connected to said data transfer means for actuating the data transfer means to transfer data between said front store to said back store in accordance with said changed indications;
   hierarchy control means connected to said data transfer means, to said front and back stores and to said data integrity control means and being operative to ensure congruence only between copies of supposedly like data stored in said front and back stores which is indicated as retentively stored data;
   scheduling means in said hierarchy control means coupled to said data transfer means and to said front store for scheduling data transfers via said data transfer means from said front store to said back store of data stored in said front store in accordance with predetermined criteria which is independent of said retentive and exempt indications; and
   replacement criteria means in the scheduling means for generating, independently of said retentive and exempt indications, predetermined criteria for moving a copy of data stored in said front store to said back store for retentive storage in said back store.

31. The data-storage system set forth in claim 30, further including, in combination:
   command receiving means for being selectively coupled to said host processor for receiving commands, including data access commands, therefrom relating to said retentive and exempt indications and including first commands for altering said retentive and exempt indications between said retentive stored data indication and said exempt indication and second commands for discarding data which is exempted from said retentive storage and being coupled to said data integrity control means for transferring said commands to said data integrity control means for actuating said change means of said data integrity control means changing said retentive and exempt indications whereby said data integrity control means responds to said changes for ensuring congruence or discarding data respectively in response to said first and second commands.

32. The data-storage system set forth in claim 31 wherein said host processor has a plurality of identifiable computer processes;

the improvement further comprising:

means in said command receiving means for receiving identification signals from said host processor for identifying host computer processes respectively by USEIDs and which ones of the identified computer processes are the computer processes permitted to access the exempt data; and further means in said command receiving means for receiving an access indication in a series of data access commands that indicate said data access commands are to work with said exempted data and compare means for comparing the USEID of said series of said data access commands with the previously received USEID for permitting access to said addressable data storage areas with respect to exempt data and for indicating an error to said host processor whenever said USEID of said series of data access commands does not agree with a previously received USEID.

33. The data-storage system set forth in claims 30 or 31, further including:

error detection means for detecting errors in said volatile front store error control means connected to said data integrity control means and to said error detection means and having means operative after said error detection means has indicated an error in said volatile front store for allowing said hierarchy control means to enable plenary access to data stored in those addressable data storage areas of said front store storing said retentively stored data by first accessing said retentive back store to retrieve the retentive data therefrom rather than from the volatile front store and for preventing access to said addressable data storage areas storing said exempt data; and means in said data integrity control means for supplying said retentive and exempt indications to said error control means.

34. The data-storage system set forth in claim 30, further including:

means in said peripheral data-storage system for receiving from the host processor a plurality of exempt data identification authorizations and exempt data-access requests for requesting access to exempt data with each request having an exempt data identification and being coupled to said data integrity control means for supplying said identification authorizations and said data integrity control means having access authorization means for storing said received exempt data identification authorizations and enabling access to said exempt data, whether stored in said volatile front store or in said retentive back store, only when a received data access request has an exempt data identification matching the received and stored exempt data identification authorization for the requested exempt data access.

35. The data-storage system set forth in claims 30 or 34 wherein said retentive back store includes a plurality of addressable data recorders moving-media, each of said data recorders having a plurality of said addressable data storage areas; and means in said data integrity control means for controlling said retentive or exempt indications in accordance with said addressable data storage recorders whereby data accesses to the recorders are independent of each other.

36. The data-storage system set forth in claims 30 or 34, further including:

directory means indicating data stored in said volatile front store and having means responsive to said directory means indicating a requested access does not have an addressable data storage area in said volatile front store allocated thereto to enable said host processor to access said retentive back store independently of said retentive or exempt indications.

37. In a data-storage hierarchy for being connected to a host processor and having a volatile front store and a retentive back store with data transfer means to transfer data therebetween, each store having a plurality of addressable data storage areas;

address means connected to said front and back stores for enabling data stored in said front store to be addressable by addresses of said back store as data related to data stored at the respective back store addresses;

the improvement comprising:

data integrity control means for indicating which data stored in said volatile front store is retentively stored in said back store and which data stored in said front store is exempt from being retentively stored in said back store;

change means connected to said data integrity control means for acuating said data integrity control means for any one of said volatile front store addressable data storage areas to change between said retentive and exempt indications and connected to said data transfer means for actuating the data transfer means to transfer data between said front store to said back store in accordance with said changed indications;

hierarchy control means connected to said data transfer means, to said front and back stores and to said data integrity control means and operative to ensure congruence between data stored in said front and back stores which is retentively stored data and having means for detecting and indicating a current error status of said data stored in said front store that is exempt from being retentively stored; and responding means in said hierarchy control means connected to said front store for responding to said current error status to block access to said exempted data stored in said front store that is related to said indicated error status.

38. The data-storage hierarchy sset forth in claim 37, further including:

directory means in said hierarchy control means for indicating which data is stored in said volatile front store, means for detecting an error in said directory means and supplying a signal indicating said detected and indicated error as said current error status.

39. The data-storage hierarchy set forth in claim 38, further including:
   memory means in said hierarchy control means for storing signals indicating an identification of authorized accesses for said exempt data stored in said front store and said responding means responding to said detected and indicated error for erasing said identification indicating signals; and
   access control means coupled to said front and back stores and to said data integrity control means and to said memory means for allowing access to said exempt data only when an identification is received with a given access that corresponds to an identification indicated by signals stored by said memory means.

40. The data-storage hierarchy set forth in claims 32, 33 or 39, further including:
   command means coupled to said change means and to said hierarchy control means and for receiving command signals from said host processor;
   the command means indicating a first command received from said host processor for altering the data integrity control means indications whereby data stored in said data-storage hierarchy can be switched between retentively stored data and exempt data; and
   the command means indicating a second command indicating a discard of data for discarding exempt data stored in said front store irrespective of what data is stored in the back store.

41. In a data-storage hierarchy for being connected to a host processor and having a volatile front store and a retentive back store with data transfer means to transfer data therebetween, said data transfer means for transferring data from the host processor to said front store for storage therein and for transferring data from said back store to said front store for storage therein to be later accessed by said host, each store having a plurality of addressable data storage areas; address means for enabling data stored in said front store to be addressable by addresses of said back store as data related to data stored at the respective back store addresses;
   the improvement comprising:
   data retention control means for indicating which data stored in said hierarchy is committed to be retentively stored in said back store and stored in said front store as related data and indicating which data stored in said hierarchy is exempt from said retentive storage such that said exempt data is nonretentively stored in said front store independently of all of its related data stored in said back store;
   front store control means coupled to said data retention control means and said data transfer means for controlling said data transfer means in accordance with said indications such that said retentively stored data stored in said front store that is to be congruent with related data stored in said back store is transferred between said front and back stores to achieve said congruence and for substantially ignoring the congruence or noncongruence of said exempt data which is stored in said front store even with supposedly related data stored in said back store; and
   change means connected to said data retention control means for changing said indications for any one of said volatile front store addressable data storage areas between indicating retentive or exempt data and connected to said data transfer means for actuating the data transfer means to transfer data between said front store to said back store in accordance with said changed indications.

42. The data-storage hierarchy set forth in claim 41, further including:
   replacement control means coupled to said front store control means and to said front and back stores and coupled to said data transfer means to initiate data transfers between said front and back stores independently of said data retention control means whereby utilization of the addressable data storage areas of said front store are managed by transferring data from said front store to said back store for freeing ones of said addressable data storage areas in said front store for receiving data to be stored for faster access by the host processor.

43. The data-storage hierarchy set forth in claim 42, further including:
   command execution means coupled to said front store control means and to said data retention control means for receiving from said host processor a first command and for actuating said data retention and front store control means to change the status of predetermined exempt data stored in the data-storage hierarchy between retentively and exempt stored data and, when changed from exempt to retentive storage, to actuate the data transfer means to transfer data between said front and back stores such that any differences between copies of data in said front and back stores are eliminated, and for being responsive to a second command for discarding data from said front store which has been exempt data independent of the congruence or noncongruence of such discarded data with respect to data currently stored at said respective back store addresses.

44. The data-storage hierarchy set forth in claim 41, further including:
   means in said data retention control means for indicating when said exempt data is volatile data which eventually will be stored retentively and which of said exempt data is transient data which is exempt data which eventually will be discarded; and
   hierarchy control means coupled to said data retention control means, front store control means and said transient and volatile indicating means for actuating said data transfer means to move data between said stores in accordance with said transient and volatile indications such that the volatile indicated data stored in said front store is transferred to said back store before said transient indicated data stored in said front store, whereby said transient data tends to be discarded from said front store without being stored in said back store.

45. In the data-storage hierarchy set forth in claim 41, further including, in combination:
   exempt data access control means connected to said data retentive control means and to said front store for storing an identification element which indicates authorized access to said exempt data stored in said data-storage hierarchy, stored either in said front or said back store;
   ID means connected to said front store control means for receiving and storing commands supplied by said host processor including commands requesting access to said exempt data, said commands also including an access identification;

compare means connected to said exempt data access control means and to said ID means and to said front store control means for comparing said access identification with said identification element and being responsive to a predetermined comparison to actuate said front store control means to enable access to said exempt data and operative to indicate an error to the host processor whenever said comparison is other than said predetermined comparison;

error control means connected to said front store and to said ID means for detecting errors in said front store and operative upon detecting an error in said front store to actuate said ID means to erase said identification element for preventing access to said exempt data;

host communication means connected to said ID means, said front store control means and to said error control means for communicating said detected error to said host and for receiving a new identification element from said host for re-enabling access to said exempt data after detecting and reporting an error in the front store.

46. The machine-implemented method of operating a data-storage hierarchy having a volatile front store and a retentive back store with data transfer means to transfer data therebetween, each store having a plurality of addressable data storage areas;

addressing means coupled to said front and back stores for enabling addressing data stored in said front store by using addresses of said back store with data so addressable being related data stored in data storage areas at said respective addresses in said back store;

the improvement comprising the steps of:

establishing control data for indicating for each of the addressable data storage areas of the front store whether data stored therein or to be stored therein is being stored either as said exempted data or said retentive data;

receiving a first type of data as retentive data subject to said data-storage hierarchy ensuring retentive storage of said received data and storing said received retentive data in said retentive back store and in said front store when access to said retentive data is to be enhanced;

receiving a second type of data as data exempted from said retentive storage and storing said exempted data in said volatile front store; and changing the control data indications of retentive storage and exempted storage for any one of said addressable data storage areas in said front store between said retentive storage and exempted storage indications and after each change transferring data between said front store and said back store in accordance with the changed indications.

47. The machine-implemented method set forth in claim 46, further including the steps of:

establishing data residence criteria for said front store and replacing data stored in said front store with other data in accordance with said established residence criteria which is independent of whether data stored in said volatile front store to be replaced is said retentive or exempted data; and promoting data from said back store to said front store in accordance with received access requests from a connected host processor independently of whether the data stored in said back store that is to be promoted to said front store is said retentive or exempted data.

48. The machine-implemented method set forth in claim 46, further including the steps of:

monitoring host accesses to said exempted data;

detecting an error in said control data; and then blocking host processor access to all exempted data stored in said data-storage hierarchy relatable to said detected error because of an error in said control data while concurrently allowing host processor access to said retentive data stored in said back store.

49. The machine-implemented method set forth in claim 46, further including the steps of:

establishing a plurality of USEIDs (use identifications) which correspond to computer processes in a host processor which may access data stored within the data-storage hierarchy;

establishing a list of authorized USEIDs for said exempted data including one or more USEIDs for each group of said exempted data and establishing a plurality of exempted data groups; and limiting access to each group of exempted data to computer processes identified by the USEIDs, respectively.

50. The machine-implemented method set forth in claim 49, wherein the data-storage hierarchy has a plurality of addressable data storage devices in said back store, further including the step of:

independently establishing said USEIDs for each said device for data stored in said front store.

51. The machine-implemented method set forth in claims 49 or 50, further including the steps of:

receiving a command from said host processor for indicating a change in status of data between retentive and exempt storage and then doing the changing step for changing the status of such data stored in the volatile front store in accordance with said received command.

52. The machine-implemented method set forth in claim 50, further including the step of:

identifying a plurality of extents of said addressable data storage areas of said back store for each of said addressable devices as being eligible for storing said exempted data.

53. The machine-implemented method set forth in claim 51; further including the steps of:

receiving a second command from said host for discarding predetermined portions of said exempted data and then discarding said predetermined portions of said exempted data from said front store while retaining copies of said predetermined data which were stored in said retentive back store independently of and before receiving said second command.

54. The machine-implemented method of operating a data-storage hierarchy adapted to be connected to an external host processor and having a volatile front store and a retentive back store with means to transfer data signals therebetween, each store having a plurality of addressable data storage areas; addressing means coupled to said front and back stores for enabling addressing data stored in said front store by using addresses of said back store with data so addressable being related data to data stored in data storage areas having said back store respective addresses in said back store;

the improvement comprising the steps of:
for each of the data storage areas in the volatile front store, indicating which data stored in said volatile front store is to be retentively stored and which data is to be exempted from said retentive data storage;
changing the indications of retentive storage and exempted storage for any one of said addressable data storage areas in said front store between said retentive storage and exempted storage indications and after each change transferring data between said front store and said back store in accordance with the changed indications;
transferring data between said stores to ensure congruence only between data stored in said front and back stores which is indicated as being retentively stored; and
independently of said retentive or exempt storage in said front store, transferring data between said stores for keeping data in said front store which is expected to be requested by the external host processor.

55. The machine-implemented method set forth in claim 54, further including the steps of:
receiving from the external host processor a USEID (use identification) which identifies
limiting access to said predetermined portions in accordance with said USEID such that only those accesses having a USEID corresponding to the USEID associated with the respective predetermined portions; and
supplying an error signal to said external host processor whenever there is a noncompare between a USEID of a received access request and a USEID for the respective predetermined portion.

56. The machine-implemented method set forth in claims 54 or 55, wherein the data-storage hierarchy includes a plurality of addressable data storage devices in said back store, further including the step of:
independently establishing USEIDs (use identifications) for each of the plural addressable data storage devices.

57. The machine-implemented method set forth in claims 54 and 55, further including the steps of:
receiving from the external host processor a signal indicating a change in the status of predetermined data between retentive and exempted data storage and then changing the status of such indicated data including discarding said predetermined data from said front store when a given indicated change of data is received.

58. The machine-implemented method set forth in claims 54 or 55, further including the steps of:
receiving from the external host processor a signal indicating a change in status of predetermined data between retentive and exempted data storage and then changing the status of such indicated data including moving said predetermined data from said front store to said back store when a given indicated change of data is received for ensuring congruence of retentively stored data stored in said front and back stores.

59. The machine-implemented method of operating a data-storage hierarchy connectable to a host processor and having a volatile front store and a retentive back store with means to transfer data signals therebetween, each store having a plurality of addressable data storage areas; addressing means coupled to said front and back stores for enabling addressing data stored in said front store by using addresses of said back store with data so addressable being related data to data stored at said respective addresses in said back store;
the improvement comprising the steps of:
indicating which data stored in said volatile front store is to be retentively stored and which data is to be transiently stored in said data storage hierarchy;
transferring data between said stores to ensure congruence only between data stored in said front and back stores which is to be retentively stored;
changing the indications of retentive storage and exempted storage for any one of said addressable data storage areas in said front store between said retentive storage and exempted storage indications and after each change transferring data between said front store and said back store in accordance with the changed indications;
receiving and storing data from either said host processor or said back store for storage in said front store in accordance with said indications;
detecting error conditions in said volatile front store related to said transiently stored data; upon detecting said error conditions inhibiting access only to said transiently stored data; and
signalling said host processor that said error condition occurred for enabling said host processor to recover from a loss of transiently stored data.

60. The machine-implemented method set forth in claim 59, further including receiving the host processor a USEID (use identification) for indicating permitted access to said transiently stored data;
sequentially receiving a plurality of said USEIDs and storing same one at a time for evaluating access to said transiently stored data, limiting access to said transiently stored data in accordance with said USEID such that any access to said transiently stored data requires an accompanying USEID matching the stored USEID; and
upon detecting said error condition, erasing said USEID associable with said detected error condition such that access to the transiently stored data is prevented.

61. The machine-implemented method set forth in claim 60, further including receiving a signal from a host processor indicating discard of a predetermined portion of said transiently stored data; and
effectively erasing data stored in said volatile front store which corresponds to said predetermined data while not affecting any of said predetermined data currently stored in said back store.

62. The machine-implemented method set forth in claim 60, further including the steps of:
promoting data from said back store to said front store independently of said retentive or transient storage and replacing data in said front store for receiving new data from either said back store or from said host processor independently of said retentive storage or said transient storage.

63. The machine-implemented method set forth in claim 60, further including the steps of:
receiving a predetermined signal from a host processor and in response to said predetermined signal again enabling access to said front store area that stored said transiently stored data which had access prevented because of said detected error condition.

64. A data-storage hierarchy for being connected to a host processor and having a volatile front store and a retentive back store;

data transfer means connected to said stores for transferring data signals therebetween and having means for enabling coupling to said host processor for transferring data signals therewith;

each of said stores having a plurality of addressable data storage areas with means to address same; control means having means coupled to said stores and said data transfer means for controlling operation thereof and for coupling the data-storage hierarchy to said host processor for receiving command signals therefrom relating to retrieval of data from and storing data in said stores; said control means having a digital processor and a control store for storing programs of computer instructions for operating said digital processor to operate the data-storage hierarchy; and said programs including a first means for indicating which data storable in said back store is currently stored in said front store, and a congruent state of such front store stored data with respect to data stored in said back store and a current usage state of such data stored in said front store; second means for indicating as to current data transfers with said host processor which data transfers with said host processor relate to data retentively storable in said data-storage hierarchy and which data transfers with said host processor relate to data exempt from said retentive storage in said data-storage hierarchy; third means coupled to said second means and responsive to said second means retentive data storage indication for initiating data transfers between said stores for ensuring congruence of copies of data supposedly stored in both of said stores; and fourth means coupled to said first means and to said third means for initiating data transfers from said back store to said front store for storing that data in said front store which has recent or expected host processing usage independently of said retentive or exempted data storage.

* * * * *